(12) United States Patent
Eizenman et al.

(10) Patent No.: US 11,093,374 B2
(45) Date of Patent: Aug. 17, 2021

(54) SYSTEM AND METHOD FOR CONTINUOUS TESTING AND DELIVERY OF SOFTWARE

(71) Applicant: SeaLights Technologies LTD, Kefar Sava (IL)

(72) Inventors: Alon Eizenman, Netanya (IL); Eran Sher, Kfar Saba (IL)

(73) Assignee: SeaLights Technologies LTD, Kfar Saba (IL)

( * ) Notice: Subject to any disclaimer, the term of this patent is extended or adjusted under 35 U.S.C. 154(b) by 64 days.

(21) Appl. No.: 16/323,263

(22) PCT Filed: Jun. 20, 2017

(86) PCT No.: PCT/IL2017/050684
§ 371 (c)(1),
(2) Date: Feb. 5, 2019

(87) PCT Pub. No.: WO2018/029668
PCT Pub. Date: Feb. 15, 2018

(65) Prior Publication Data
US 2019/0171550 A1    Jun. 6, 2019

Related U.S. Application Data

(60) Provisional application No. 62/372,419, filed on Aug. 9, 2016.

(51) Int. Cl.
*G06F 11/36* (2006.01)
*G06F 8/60* (2018.01)
(Continued)

(52) U.S. Cl.
CPC ............ *G06F 11/3676* (2013.01); *G06F 8/60* (2013.01); *G06F 8/71* (2013.01); *G06F 8/75* (2013.01);
(Continued)

(58) Field of Classification Search
CPC .... G06F 8/71; G06F 11/3676; G06F 11/3688; G06F 11/3664; G06F 8/60; G06F 11/3604; G06F 11/36; G06F 8/75
See application file for complete search history.

(56) References Cited

U.S. PATENT DOCUMENTS 5,778,169 A    7/1998  Reinhardt
7,028,290 B2   4/2006  Srivastava
(Continued)

FOREIGN PATENT DOCUMENTS

CN    102419728       4/2012
CN    102419728 A     4/2012
(Continued)

OTHER PUBLICATIONS

Extended European Search Report for App No. EP17838916.9, dated Apr. 14, 2020, 12 pages.
(Continued)

*Primary Examiner* — Wei Y Zhen
*Assistant Examiner* — Amir Soltanzadeh
(74) *Attorney, Agent, or Firm* — Graeser Associates International Inc; Dvorah Graeser

(57) ABSTRACT

A system and method for CI/CT/CD, which is continuous integration/continuous testing/continuous delivery, in which testing is fully integrated to the needs of rapid code development and delivery. The system is determining test coverage of a plurality of tests, comprising a code builder for providing code, a code tester for testing the code with said plurality of tests, and a code test analyzer for analyzing results of said plurality of tests to determine coverage of said code by said plurality of tests.

2 Claims, 19 Drawing Sheets

(51) Int. Cl.
    *G06F 8/71* (2018.01)
    *G06F 8/75* (2018.01)
(52) U.S. Cl.
    CPC .......... *G06F 11/36* (2013.01); *G06F 11/3604* (2013.01); *G06F 11/3664* (2013.01); *G06F 11/3688* (2013.01)

(56) References Cited

U.S. PATENT DOCUMENTS

| | | |
|---|---|---|
| 7,178,131 B2 | 2/2007 | Mitchell |
| 7,281,242 B2 | 10/2007 | Inamdar |
| 7,530,060 B1 | 5/2009 | Fontenot |
| 7,774,663 B2 | 8/2010 | Kapur |
| 7,836,367 B2 | 11/2010 | Kapur |
| 7,856,332 B2 | 12/2010 | Karthikeyan |
| 7,868,780 B2 | 1/2011 | Engel |
| 7,899,661 B2 | 3/2011 | Rompaey |
| 7,900,105 B2 | 3/2011 | Kapur |
| 7,962,905 B2 | 6/2011 | Inamdar |
| 7,966,346 B1 | 6/2011 | Jameson |
| 7,975,257 B2 | 7/2011 | Fanning |
| 8,079,018 B2 | 12/2011 | Huene |
| 8,205,191 B1 | 6/2012 | Kolawa |
| 8,266,563 B2 | 9/2012 | Plaza |
| 8,386,972 B2 | 2/2013 | Hakewill et al. |
| 8,468,503 B2 | 6/2013 | Grosse |
| 8,473,907 B1 | 6/2013 | Zandi |
| 8,516,434 B2 | 8/2013 | McPeak |
| 8,521,499 B1 | 8/2013 | Rompaey |
| 8,522,221 B1 | 8/2013 | Braun |
| 8,543,367 B1 | 9/2013 | Van Rompaey |
| 8,578,344 B2 | 11/2013 | Godefroid |
| 8,739,135 B2 | 5/2014 | Eigler |
| 8,762,918 B2 | 6/2014 | Ni |
| 8,832,640 B1 | 9/2014 | Roche |
| 8,898,647 B2 | 11/2014 | Sobolev |
| 8,938,729 B2 | 1/2015 | Martin |
| 9,075,914 B2 | 7/2015 | Huggins |
| 9,141,807 B2 | 9/2015 | Chou |
| 9,170,847 B2 | 10/2015 | Huggins |
| 9,389,986 B2 | 7/2016 | Abraham |
| 9,559,928 B1* | 1/2017 | Porter ................. H04L 41/5058 |
| 2005/0166094 A1 | 7/2005 | Blackwell |
| 2005/0229165 A1 | 10/2005 | Ma |
| 2006/0179350 A1 | 8/2006 | Nathan |
| 2006/0195724 A1 | 8/2006 | Filho |
| 2007/0006041 A1 | 1/2007 | Brunswig |
| 2007/0074175 A1 | 3/2007 | Bengtsson |
| 2008/0120602 A1 | 5/2008 | Comstock |
| 2008/0141224 A1 | 6/2008 | Kawasaki |
| 2009/0144698 A1 | 6/2009 | Fanning |
| 2009/0249305 A1 | 10/2009 | Li |
| 2009/0287729 A1 | 11/2009 | Chen |
| 2009/0327680 A1 | 12/2009 | Dale |
| 2010/0058295 A1* | 3/2010 | Johnson .............. G06F 11/3676 717/124 |
| 2012/0084756 A1 | 4/2012 | Subramanian |
| 2012/0167057 A1 | 6/2012 | Schmich |
| 2012/0198421 A1 | 8/2012 | Arumugham |
| 2012/0222014 A1 | 8/2012 | Peretz |
| 2012/0233596 A1 | 9/2012 | Adler |
| 2013/0125096 A1 | 5/2013 | Kruetzfeldt |
| 2013/0346046 A1 | 12/2013 | Rompaey |
| 2013/0346947 A1 | 12/2013 | Braverman |
| 2014/0007090 A1 | 1/2014 | Rugina |
| 2014/0047538 A1 | 2/2014 | Scott |
| 2014/0059399 A1 | 2/2014 | Kapur |
| 2014/0096113 A1 | 4/2014 | Kuehlmann |
| 2014/0173564 A1 | 6/2014 | Crawford |
| 2014/0189641 A1* | 7/2014 | Anderson ................. G06F 8/71 717/110 |
| 2014/0331206 A1 | 11/2014 | Abraham |
| 2014/0351793 A1 | 11/2014 | Bartley |
| 2015/0007140 A1 | 1/2015 | Boshernitsan |
| 2015/0026121 A1* | 1/2015 | Shani ................ G06F 16/24578 707/609 |
| 2015/0052501 A1* | 2/2015 | Shani .................. G06F 11/3688 717/124 |
| 2015/0095703 A1 | 4/2015 | Girmonsky |
| 2015/0381467 A1 | 12/2015 | Girmonsky |
| 2016/0026559 A1* | 1/2016 | Geheb .................. G06F 11/368 714/38.1 |
| 2016/0259714 A1 | 9/2016 | Shor |
| 2016/0299679 A1 | 10/2016 | Krajec |
| 2017/0003948 A1* | 1/2017 | Iyer ...................... H04L 43/045 |
| 2019/0236012 A1 | 8/2019 | Gschwind |
| 2020/0084152 A1 | 3/2020 | Zhang |

FOREIGN PATENT DOCUMENTS

| | | |
|---|---|---|
| CN | 102722436 | 10/2012 |
| CN | 102722436 A | 10/2012 |
| CN | 102722436 B | 10/2012 |
| CN | 103631707 A | 3/2014 |
| CN | 103631707 B | 3/2014 |
| CN | 103699476 | 4/2014 |
| CN | 103699476 A | 4/2014 |
| CN | 104598378 | 5/2015 |
| CN | 104598378 B | 5/2015 |
| CN | 105224460 | 1/2016 |
| CN | 105224460 A | 1/2016 |
| CN | 106326118 | 1/2017 |
| CN | 106326118 A | 1/2017 |
| KR | 100990777 | 6/2008 |
| KR | 100990777 B1 | 6/2008 |
| KR | 20150007806 | 1/2015 |
| KR | 20150007806 A | 1/2015 |
| WO | 2013115797 A1 | 8/2013 |

OTHER PUBLICATIONS

Office Action dated Nov. 3, 2020 for U.S. Appl. No. 16/583,540 (pp. 1-14).
Title: The dynamic probe class library—an infrastructure for developing instrumentation for performance tools, author: L DeRose, published on 2001 Source: IEEE, 7 pages.

* cited by examiner

SYSTEM AND METHOD FOR CONTINUOUS TESTING AND DELIVERY OF SOFTWARE

FIELD OF THE INVENTION

The present invention, in at least some embodiments, is of a system and method for continuous software testing, and in particular, for testing in a system of continuous code delivery.

BACKGROUND OF THE INVENTION

In order for software applications to be delivered quickly, with new features on rapid release, new systems for coding and software release have been developed. Termed "CI/CD" for "continuous integration and continuous delivery", these systems enable new features to be rolled out rapidly for consumption by users.

Unfortunately, such rapid release has put a significant strain on existing systems for code development, particularly for code testing. Previously, systems for code delivery were set up for a new code release once or twice per year, with static delivery dates that were fixed well in advance. This rigid scheduling made it easy to schedule tests and to have sufficient time for all tests to be performed before the code was released.

CI/CD does not integrate well with such rigid test scheduling as it requires dynamic analysis of code changes and test coverage. Existing code quality management systems are all built for an earlier age of rigid scheduling and cannot easily be adjusted to the new requirements of dynamic testing and release.

To further increase the complexity of what must be tested, dynamic code and test analysis is now also required. Previously, static code analysis analyzed a complete set of code, which was only changed once or twice per year. Dynamic code analysis is better suited to the new rapid release format, but has only recently been developed and is not fully implemented in all Quality management systems. Analysis and management of the results of either static or dynamic code analysis are both lagging far behind the new needs of CI/CD systems.

In addition, as DevOps and Agile methods are emerging, developers are building automated tests, developing automated code to test code. The number of automated tests per application is increasing dramatically, resulting in dozens and even hundreds of thousands of automated tests running for each build.

Combining all of these factors—the high speed of releases, the high number and high frequency of releases and the growing number of tests—makes it impossible to control and understand the readiness of each and every build, and whether a build is ready or not for production deployment.

For example, U.S. Pat. Nos. 8,473,907 and 7,966,346 both relate to static code analysis performed to understand dependencies and component mapping. Attempts to determine which tests are more important are described for example in U.S. Pat. No. 9,075,914, which describes a system to run Selenium tests after checking all possible user paths through software, and then determining which ones are different and which ones are more important.

US20150007140 analyzes the code for test prioritization in order to determine the order in which tests should be run.

SUMMARY OF THE INVENTION

The background art does not teach or suggest a system or method for constructing testing systems around the needs of CI/CD systems.

The background art also does not teach or suggest a system or method that is suitable for continuous deployment and release systems for software.

By contrast, the present invention, in at least some embodiments, relates to a system and method for CI/CT/CD, (continuous integration/continuous testing/continuous delivery), in which testing is fully integrated to the needs of rapid code development and delivery. Such a system needs to be capable of continuous testing with seamless integration to the CI/CD system, and be able to raise a flag if code quality is reduced—or if testing fails to determine code quality. For example, if there is a hole in test coverage, then code may not be adequately tested and hence code quality may not be correctly determined. Quality analysis is therefore an important aspect of testing code, to determine whether it is ready to release. Such quality analysis optionally and preferably is able to determine build quality, more preferably before release of a build.

The present invention, in at least some embodiments, further relates to a system and method for determining build quality for a plurality of tests being performed on each build of code across at least a plurality of environments or even every environment. Each environment may also be described as a test stage with a plurality of tests to be performed at each stage. Each stage may have its own quality measure determined, in terms of build quality, which then preferably leads to a measure of build quality for the test stages. Tests are executed on the application under test. Tests are preferably performed on the completed compiled build.

By "build quality" it is meant that the quality of a build includes one or more of the following: detection of at least one change in the code from a previous build to a current build and analysis of at least one test in one test environment to determine whether such change has been tested; assessment of at least one previously performed test; assessment of at least one test coverage; assessment of at least one test coverage hole; or a combination thereof.

By "test coverage hole" it is meant a determination that at least a portion of the code that has been modified, has not adequately been tested by test(s) that have been run, which may optionally include but is not limited to zero test coverage, in which no test that has been run tests that portion of the code.

"Test coverage" may optionally be considered according to test environment or test stage, optionally and preferably in a two step process, in which test coverage is first determined across all environments (or at least a plurality of environments) to avoid repeating footprints, and are then determined according to a specific environment. Optionally and alternatively, test coverage may be determined first per environment and then on the build level, optionally then leading to determination of complete test coverage. Test coverage is optionally determined according to environmental footprint, which relates to the build in a particular environment.

Tests may optionally be automatically selected to provide improved test coverage, for example according to one or more of changes in the code; run-time environment; previous failed tests or test coverage holes; or other priority components (such as a user request, dependency or connection to a particular code area or code family).

Test priority may optionally be determined according to the above parameters, in which the order in which tests are to be performed may optionally be determined according to test priority, such that tests which will provide more information and/or more important information are performed first. Alternatively, only certain selected tests may optionally be run at any given time, since in a continuous delivery environment, the need to release a new build may outweigh the need to run all possible tests before release.

According to at least some embodiments, the system and method as described herein may optionally be applied to a Continuous Testing paradigm, in which a build-test-release cycle is preferably implemented for code construction and implementation in a working environment. The "build" part of the cycle may optionally relate to relatively small or at least incremental differences in the code, rather than large changes to the code. In this paradigm, the system and method are preferably able to detect code changes between builds. At least partially according to these code changes, test priority and test selection are performed, so as to select matching tests and priority for running these tests.

According to at least some embodiments, test priority and selection may optionally be performed according to a variety of analytical tools, including but not limited to a calculation based on historical test status and build content (binaries and configuration files), as well as user input, environmental changes and realtime calculations; and realtime dynamic test priority calculation based on realtime coverage data collection, optionally including modifying the priority list on the fly.

For greater efficacy, optionally and preferably selected tests are automatically run across different environments and testing tools.

In order to assist users in determining the results of the tests and in selecting further actions to be performed, optionally and preferably the build quality is collected, and is more preferably displayed to the user. Such build quality information optionally includes but is not limited to one or more of test status, coverage, quality holes, trends, timing, or a combination thereof.

A build quality dashboard may optionally be implemented to show an aggregated display of all quality matrices, optionally including the previously described build quality information. To assist the user in understanding the meaning of the build quality, preferably a build quality analysis is performed, which optionally and preferably includes calculating a build scorecard. The scorecard preferably includes different various metrics to show the quality of a build. Optionally and preferably, a rule based engine may be used to determine build readiness for production deployment; such an engine may also optionally calculate the metrics for the scorecard for the user. The rule based engine may also optionally and preferably calculate coverage on distributed application.

Some non-limiting examples of build quality metrics include quality analytics such as automated test maintenance analysis, to detect irrelevant tests, redundant or never failing tests, which may optionally be eliminated. Other quality analytics optionally and preferably include the detection of problematic code areas—code that's uniquely or frequently associated with failing tests. Other quality analytics optionally and preferably include the detection of duplicate and similar tests; comparing footprints of production and QA execution to highlight relevant and irrelevant tests, and improve priority. Other quality metrics may optionally include detecting failed tests, to filter out failed test coverage from coverage calculation; and the automatic detection of quality holes for automatically identifying when a quality hole is closed or covered.

Other non-limiting examples of build quality analytics may optionally be determined on a build level per application component and may optionally include performing a build compare of all the quality parameters. For example, the analytics may optionally include determining the test footprint diff between environments and between builds, and the test content change detection (to be able to detect when a test has changed and to update the priority list).

According to at least some embodiments, there is provided the ability to collect footprint from a multi-tier application with automatic detection of the servers and services in each environment and application under test (with no manual configuration of the servers under test). In such an application, each tier may have its own server such that multiple servers may need to be considered in a single environment and/or several services may share the same server. Therefore it is necessary to determine which servers are related to which environment to determine the footprint, for example by determining which server(s) are performing operations for a particular environment or through a predetermined manual mapping. Optionally and preferably automatic detection is performed by analyzing messages regarding the tests and in particular, which server(s) or service(s) report that a particular test is being performed and/or which listener determines that a particular test is being executed on a particular server. The combined information allows for servers to be automatically mapped to environments.

According to at least some embodiments for testing an integration build, in which a single such integration build features a plurality of components of different versions, special testing processes are preferably performed to determine coverage, quality holes and so forth for the integration build. In particular, for an integration build, tests are performed to determine the quality of the integration between the components.

According to at least some embodiments, there is provided a method for determining test triage, to determine which methods are suspected as causing the test to fail. Such a method may also optionally include showing suspected methods/functions for failed tests, based on build-diff analysis and matching with test footprints in distributed test environments. Test triage optionally and preferably involves detecting the cause or root source of the failure, such as of failed tests, for example according to a specific change in the code. The change in the code would be identified as a potential cause for the failure of the test(s).

According to at least some embodiments, there is provided a method for automatic build discovery, optionally and preferably including an ability to automatically detect a build version of running components in a distributed testing environment.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Although the present invention is described with regard to a "computer", it should be noted that optionally any device featuring a data processor and the ability to execute one or more instructions may be described as a computer, computing device, or mobile computing device, or user device including but not limited to any type of personal computer (PC), a server, a cellular telephone, an IP telephone, a smartphone, a PDA (personal digital assistant), or a pager. A server as used herein may refer to any of a single server, multiple servers, distributed servers or cloud computing environment. Any two or more of such devices in communication with each other may optionally comprise a "computer network".

DESCRIPTION OF AT LEAST SOME EMBODIMENTS

All software modules and/or functional processes described herein are assumed to be run by a computational device or a plurality of such devices, even if not explicitly shown.

Figure 1A:
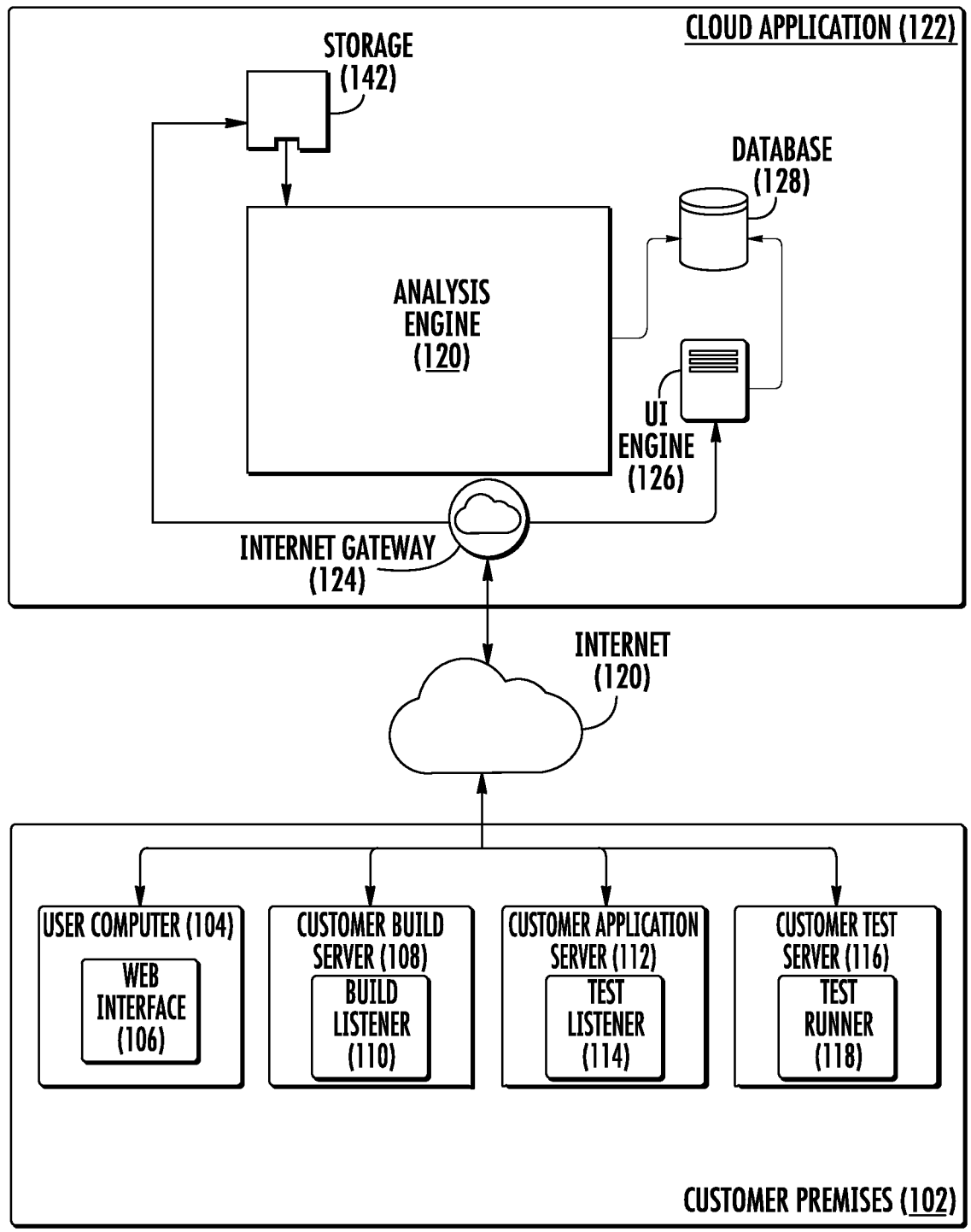
FIG. 1A shows an exemplary system, according to at least some embodiments of the present invention, for performing the build analysis, testing, and determining test coverage.

Turning now to the drawings, there is shown an exemplary system in FIG. 1A, according to at least some embodiments of the present invention, for performing the build analysis, testing, and determining test coverage. As shown, there is a customer premises 102, which connects through internet 121, which could actually be any computer network, to an internet gateway 124, at cloud application 122. As shown, preferably there is a bidirectional flow of information and commands between cloud application 122 and customer premises 102.

Customer premises 102 optionally and preferably features a user computer 104 with a web interface 106, which allows the user to control the various components of the system, including with regard to deploying builds, determining whether a build has been properly tested, analyzing test results, and also running a dashboard for various parameters for these results.

In addition, Customer Premises 102 features a customer build server 108 operating with a Build Listener 110. Customer Build Server 108 may also optionally be referred to as a CI (continuous integration) server. Customer Build Server 108 is present at Customer Premises 102 to be able to build or determine the various builds, and once the builds have actually been created, to be able to deploy them to the test environment. The Build listener 110 monitors the build server 108, and determines when a new build has been created. The Build Listener 110 then determines any differences from a previous build, optionally and preferably ignoring any extraneous information, such as comments on the code.

It should be noted that for parts of the build that need to be tested, Customer Application Server 112 preferably operates a Test Listener 114. Test Listener 114 listens to the tests which are to be performed, and also determines which tests are being performed and which tests have already been performed, in order to determine whether sufficient test coverage for the new build has been provided. Test listener 114 also determines which tests cover which parts of the build.

A Customer Test Server 116 then proceeds to run the test assisted by a Test Runner 118 that collects the test data. The information provided by operating the tests and from determining the test coverage and how the tests have been operated, is provided through Internet 120 to Internet Gateway 124, and hence to Cloud Application 122. Cloud Application 122 runs on a server which as used herein may refer to a distributed server, virtual server or cloud computing environment (not shown) or combination of these. This information is stored in the Storage 142, from which Analysis Engine 120 is able to withdraw and perform various analyses. Analysis Engine 120 performs analysis as information comes in, preferably in combination with storage 142 to actually obtain the information for testing. The results from Analysis Engine 120 are then stored in Database 128 and Storage (142), which provides a record of build changes, test coverage, test events, quality holes, trends, reports and dashboard data.

Internet gateway 124 receives messages and requests from customer premises 102, including from web interface 106. Messages and requests from web interface 106 are preferably transmitted through internet gateway 124 to UI engine 126 for answers and bidirectional commands.

Figure 1B:
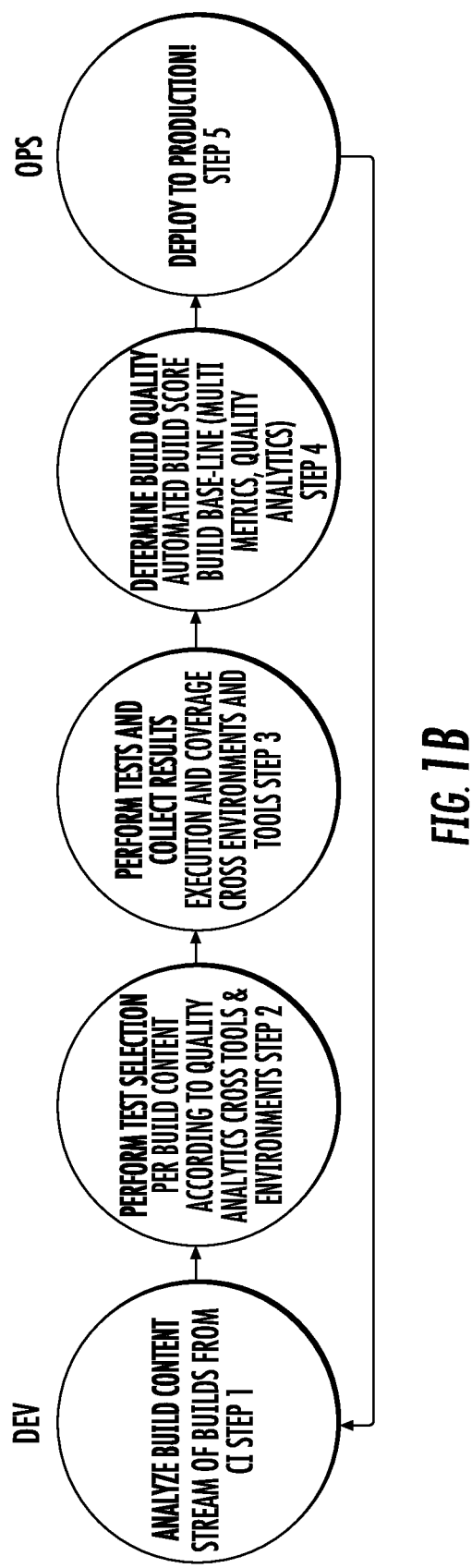
FIG. 1B shows an exemplary method according to at least some embodiments of the present invention, for performing continuous testing, including build analysis, selection of tests, and determining build quality for production deployment.

An optional exemplary method is provided according to some embodiments of the present invention for optionally operating through the system of FIG. 1A, and is shown as a method in FIG. 1B.

FIG. 1B shows an optional exemplary method for performing continuous testing, which may be, for example, optionally and preferably with the system of FIG. 1A. Developments shown on the left-hand side at various stages of testing are followed until deployment in production on the right-hand side shown as ops.

In stage 1, the build content is analyzed to determine what changes have made from the last build, optionally and preferably ignoring comments. A stream of builds is actually preferably received through the server which is creating them, and as each build is received, it is analyzed for differences from the previous builds in step 1.

Next, test selection is performed in step 2, optionally including test coverage calculation. Such a selection is preferably performed according to the build content, including any differences from previous builds, and also according to tests that have been previously run and optionally also those that are scheduled to run. Optionally the selection is performed according to quality analytics, for example, previous test coverage holes, and also according to environments in which the build is to be deployed. Optionally and preferably it is also performed across tools and environments.

Test coverage calculation may optionally form part of the test selection process, particularly in a continuous testing environment, in which for each build, optionally and preferably the following process is performed: analyze build, build quality analytics, select tests, run them, analyze results, determine build quality according to rules, and decide if the build can go to production.

The tests may optionally include one or more of a unit-test, component tests, integration tests, and other type of tests, preferably also including test automation so that the tests are run automatically, after which the coverage analysis determines whether the build may be released. The order in which the tests are run and/or whether certain tests are run according to some type of selection may optionally be determined according to requirements for test coverage.

In stage 3, the test(s) are run and the results are collected. These include the results of the test, any test coverage holes, and optionally and preferably a determination of the tests which need to be performed. The results of the test are also collected in order to determine whether the build actually passes the test and whether sufficient coverage is provided in order for the determination to be made as to whether the build passed the test in stage 3. Optionally, the test(s) are run according to a determination of test priority, such that more urgent tests are run first or optionally even only urgent tests are run. Optionally the test selection and operating order are determined according to a test management framework, which may optionally receive the operating order and then cause the tests to occur according to that order. Optionally, according to the results, the test management framework can change the test priority as the tests are performed and may optionally also be able to change the test(s) being performed and even to stop the performance, according to a dynamic test priority selection.

In stage 4, the build quality is determined, often preferably including automatically building a score for the build according to the baseline multi-metrics of the analytics. This determines whether the build may be deployed. If the build is of sufficient quality, then optionally and preferably it is deployed in stage 5.

Figure 1C:
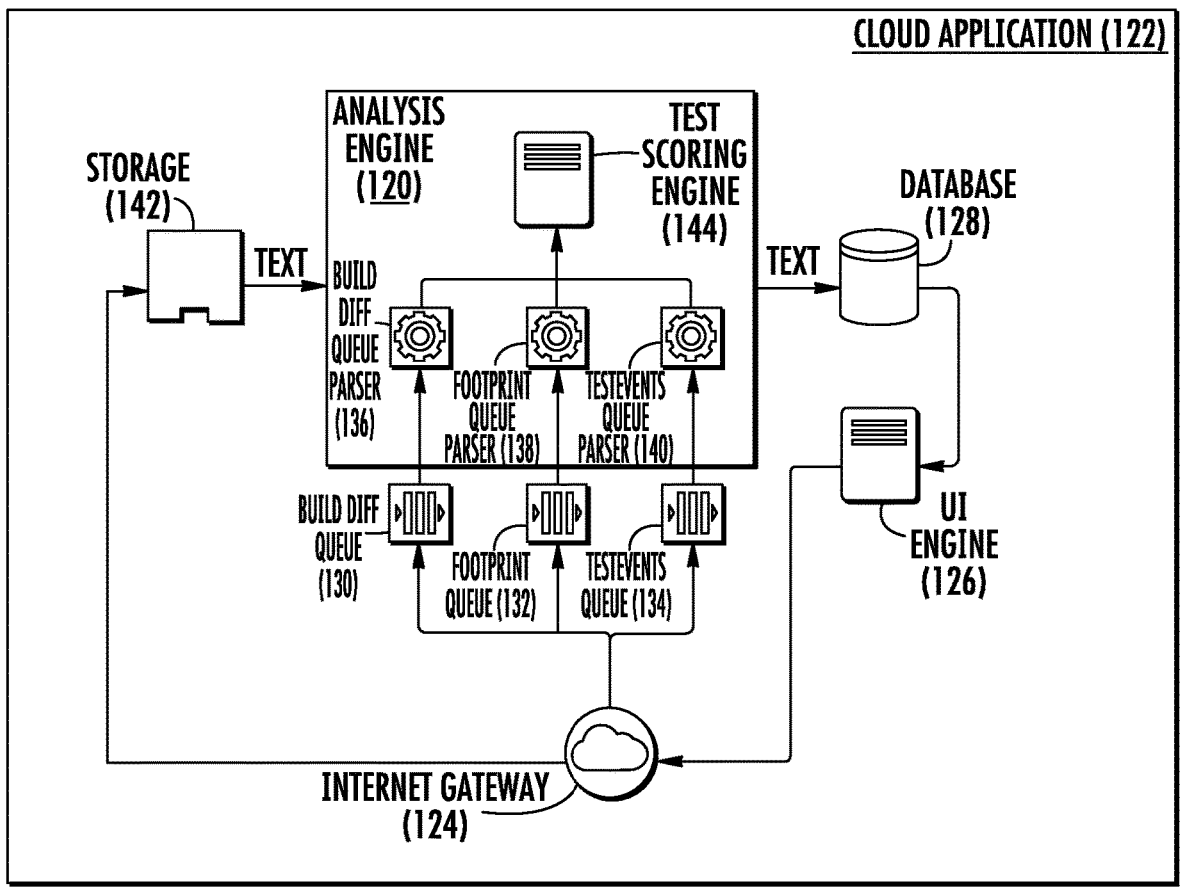
FIG. 1C shows a system drawing showing an optional exemplary implementation of Cloud Application 122, according to at least some embodiments of the present invention.

FIG. 1C shows a system drawing showing an optional exemplary implementation of Cloud Application 122, according to at least some embodiments of the present invention. Again, Cloud Application 122 is shown with Internet Gateway 124. Internet Gateway 124, again, connects to Analysis Engine 120. However, in addition, now it is shown that Internet Gateway 124 passes information to various queues, including a BuildDiff queue 130, a Footprint Queue 132, and TestEvents Queue 134.

BuildDiff Queue 130 receives a message that outlines the content of the build, and this information is then pulled by a build Queue Parser 136, which causes Analysis Engine 120 to retrieve information from Storage 142 regarding the content of the build. Footprint Queue 132 receives information regarding test coverage. This messaging causes the Footprint Queue Parser 138 to pull information from Storage 142 for further analysis. TestEvents Queue 134 receives information regarding tests that have been performed and the results. This causes TestEvents Queue Parser 140 to pull the information from storage 142 regarding the test results.

All this information is optionally and preferably fed into the Database 128 and is then handled by Test Scoring Engine 144, as shown. Test Scoring Engine 144 then determines the level of the test, whether the code passes the test and whether the code has undergone sufficient testing. This information is then stored in Database 128. In addition, the information regarding whether the build passed and whether or not there's sufficient build coverage, and of course if any test holes or problems still remain, is passed through UI Engine 126.

UI Engine 126 then connects back to Internet Gateway 124, and the information is passed back to the customer server or other user computational device (not shown, see FIG. 1A).

Figure 1D:
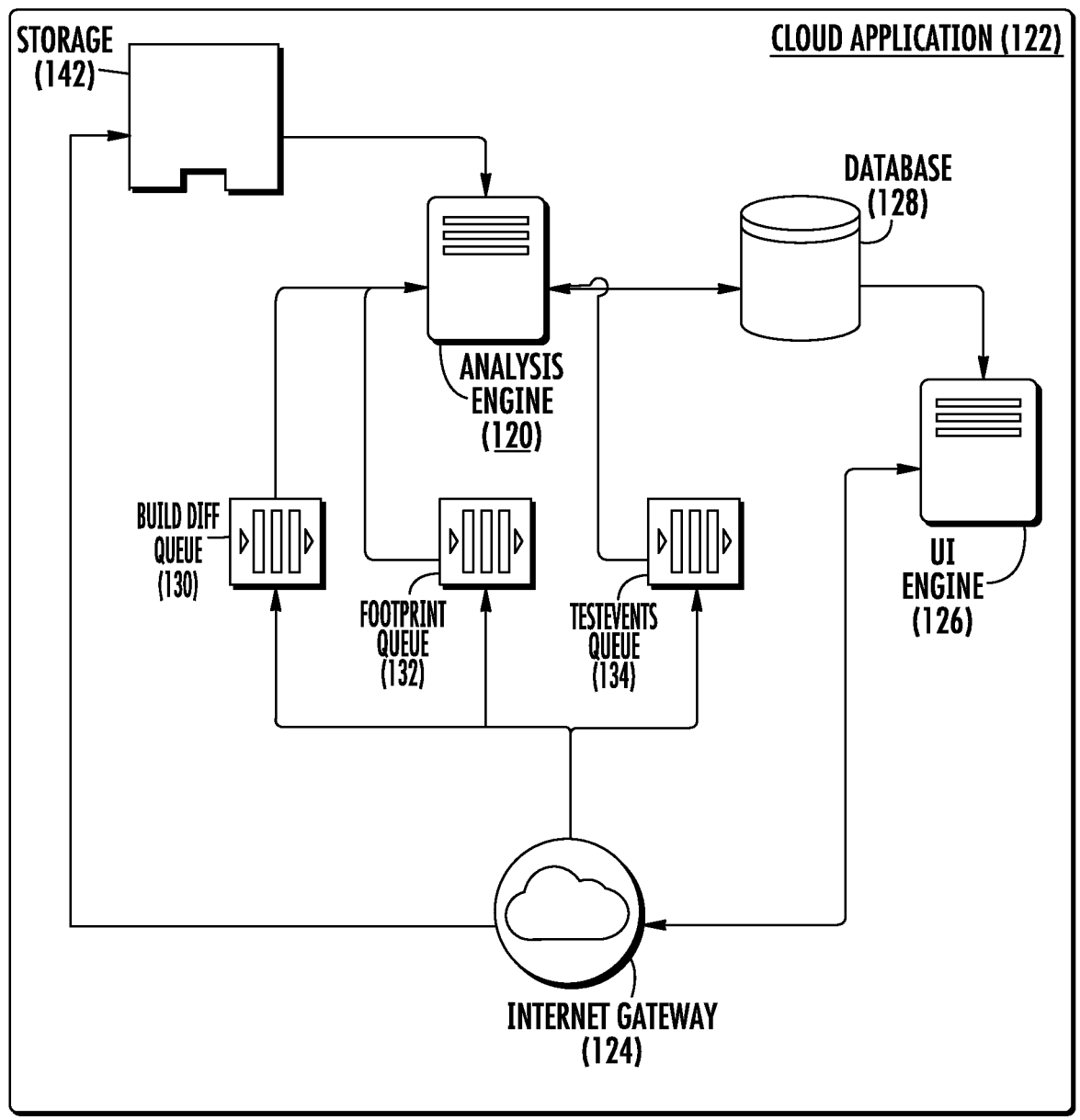
FIG. 1D shows a further exemplary implementation of Cloud Application 122.

A further exemplary implementation of Cloud Application 122 is shown in FIG. 1D. As shown, information received from the internet gateway passes to the various queues, including but not limited to BuildDiff Queue 130, Footprint Queue 132, and TestEvents Queue 134. This information is also passed to Analysis Engine 120, which proceeds to retrieve the relevant information from Storage 142.

Analysis engine 120 optionally and preferably determines test quality coverage according to the test results. Optionally, test quality coverage is determined according to one or more of detection of at least one change in the code from a previous build to a current build and analysis of at least one test to determine whether such change has been tested; assessment of at least one previously failed test; assessment of at least one test coverage hole; or a combination thereof. As previously noted, a test coverage hole may optionally be determined in the case that at least a portion of the code has not adequately been tested by test(s) that have been run, which may optionally include but is not limited to zero test coverage, in which no test that has been run tests that portion of the code.

For example, in order to determine test coverage, optionally and preferably the number of methods tested is divided by the number of methods in each component(s) to determine the percent coverage. Preferably also code branches and code lines are also considered in the calculation for the percent coverage. This determination is optionally and preferably made per environment and also across all environments.

The test cycle of a build may also optionally be divided into test environment and quality coverage may optionally be calculated as described above both per test environment and also across the entire build. Additionally and/or alternatively, unit-test results may also optionally be considered, unit-test results only provide coverage results across an entire build. The results of these tests may optionally show 100% coverage for each individual method within the build, as the tests may provide coverage such that each method is tested once, even if not all of the other test environments have 100% coverage.

According to at least some embodiments a quality hole is flagged, indicating that a method that was modified, has not been tested at all levels of integration, for example according to at least one unit-test, component test and functional test. At each higher level of integration, the number of tests that were run and the total coverage at least is considered.

It is also possible to skip a test, which may then optionally be noted separately, to show how many tests were skipped in general in terms of the coverage, and/or in comparison to what was checked in the previous build.

In addition, UI Engine 126 informs Internet Gateway and hence the customer servers (such as user computer 104) of the results. Internet Gateway 124 also connects to the UI Engine to receive any commands from the user at the Customer Premises 102.

Figure 1E:
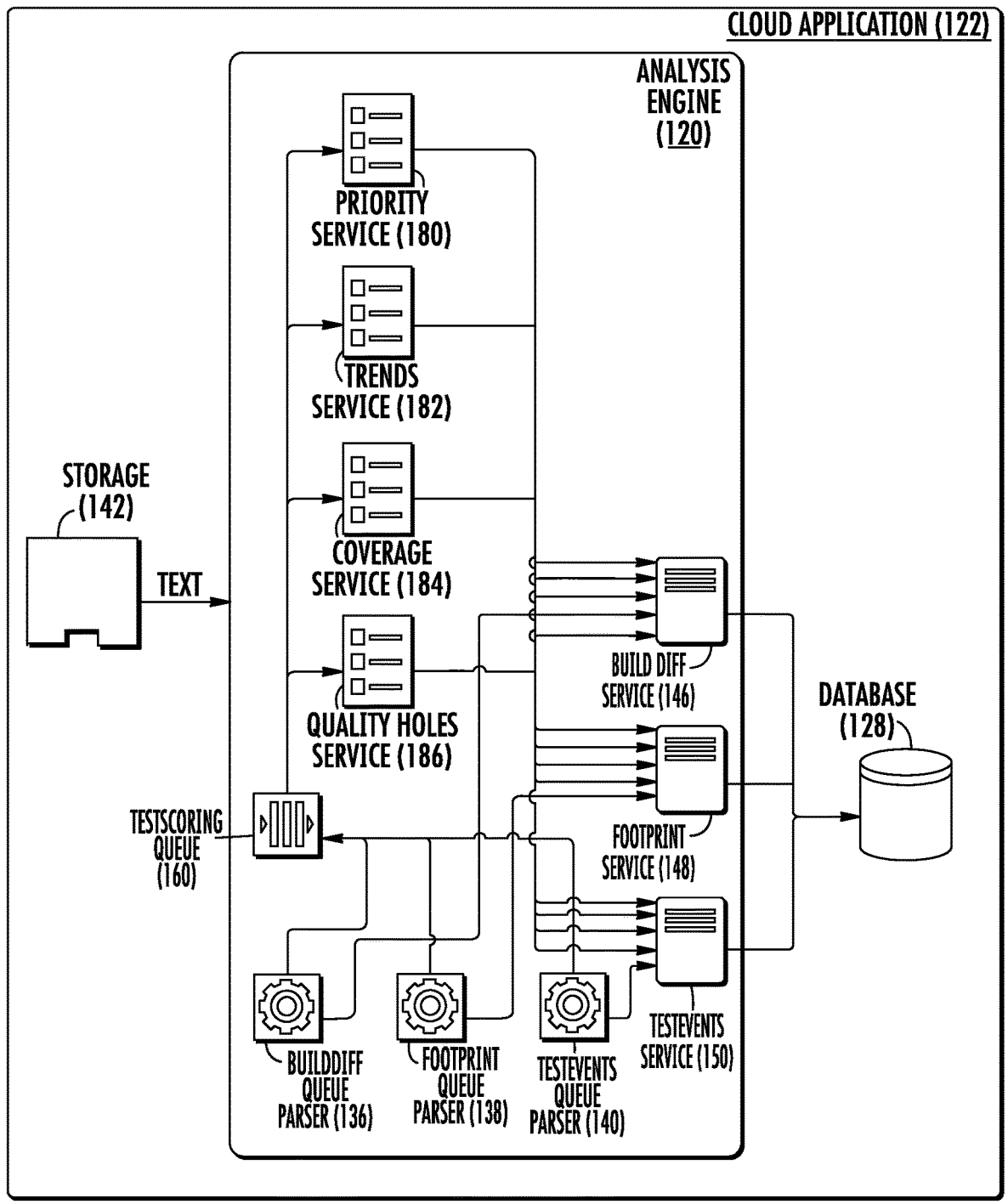
FIG. 1E shows an optional exemplary implementation of Analysis Engine 120 according to at least some embodiments of the present invention.

FIG. 1E shows an optional exemplary implementation of Analysis Engine 120 according to at least some embodiments of the present invention. As shown, Analysis Engine 120 may optionally and preferably feature various components for performing the test analysis and determining if sufficient results have been obtained, for example in terms of coverage. Again, engine 120 is shown with BuildDiff Queue Parser 136, Footprint Queue Parser 138, and TestEvents Queue Parser 140. Optionally each such parser connects to TestEvent Service 130, TestScoring Queue 160, Footprint Service 148, and BuildDiff Service 136.

In addition, builddiff queue parser 136 also preferably connects to priority service 180, trends service 182, coverage service 184, and quality holes service 186. Each such service may optionally contribute to test scoring and the determination of overall build quality coverage. If test priority is to be determined (for example whether to run a test and/or which tests to run first), the priority service 180 preferably determines the test priority.

Trends service 182 optionally and preferably determines the trends in test coverage and build quality coverage and may also optionally determine the trends in test results: for example, whether test coverage is increasing or decreasing over time; whether test coverage holes are being detected and covered by one or more tests; whether build quality is increasing or decreasing over time; and/or whether the necessary tests for achieving a certain level of test coverage are being performed.

Coverage service 184 optionally and preferably determines the level of coverage while quality holes service 186 detects holes in test coverage. This information is preferably passed back to trends service 182 in order for trends to be determined. Each service determines what information is required, such as information about changes in the build which is obtained from BuildDiff, and any other required information, and uses such information to perform the calculations.

Figure 2:
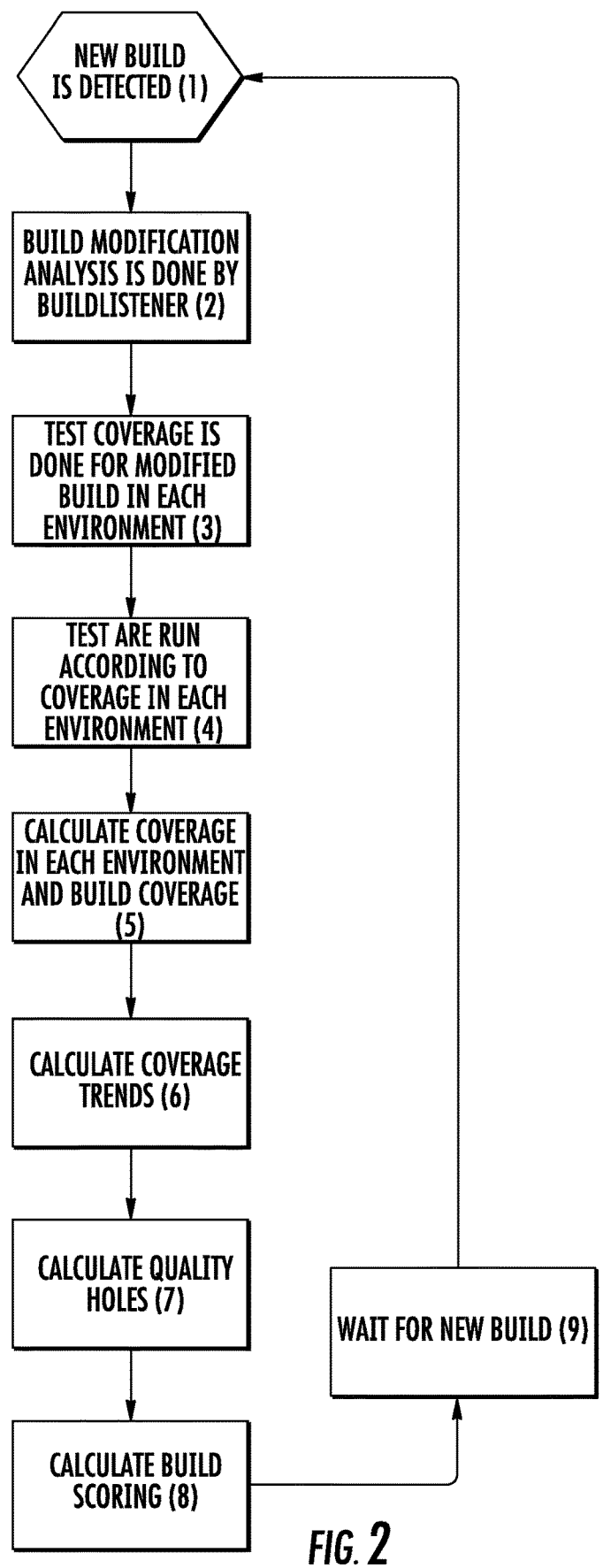
FIG. 2 shows an exemplary overall method according to at least some embodiments of the present invention, for example for operating any of the systems shown in FIG. 1.

FIG. 2 shows an exemplary overall method according to at least some embodiments of the present invention, for example for operating any of the systems shown in FIG. 1. In stage 1, a new build is detected. In stage 2, build modification analysis is done by the BuildListener to determine any differences from the previous build. In stage 3, the test coverage is analyzed for the modified build in each environment. This includes determining whether or not there are any test coverage holes, which tests should be performed to cover such holes and determining overall test coverage quality. Optionally the order in which tests are to be run is also determined in this stage.

In stage 4, the tests are run, optionally and preferably according to coverage requirements (for example in order to increase test coverage quality) in each environment. Optionally tests are run according to priority, such that the highest priority tests are performed first, and the lowest priority tests are performed last. Optionally, for each test, or alternatively, only after certain tests have been done or only after all tests have been done, post-test test coverage is calculated for each environment, and also connected to the build coverage. This is because in different environments, optionally different tests may be needed. And also, the build may be different for each requirement.

The coverage trends are calculated in stage 6, including whether, in fact, additional sufficient coverage has been provided, or whether coverage holes still remain. The actual identity of the quality holes, for example a section or sections of code that were not tested, for example for a specific build and preferably over a plurality of environments or even all environments, is preferably determined in stage 7. In stage 8, the build scoring is calculated to determine whether or not the build passes, whether it has been tested, whether it has been shown to have sufficiently high quality, and whether there are sufficiently few quality holes in order to determine the actual coverage of the test, and hence the quality of the build.

Once build quality has been calculated, the system waits for a new build in stage 9, and then the process returns back to stage 1, once a new build has been detected. Optionally, FIG. 2 may be performed continuously, or alternatively, a plurality of times, or optionally, according to a command as required.

Figure 3:
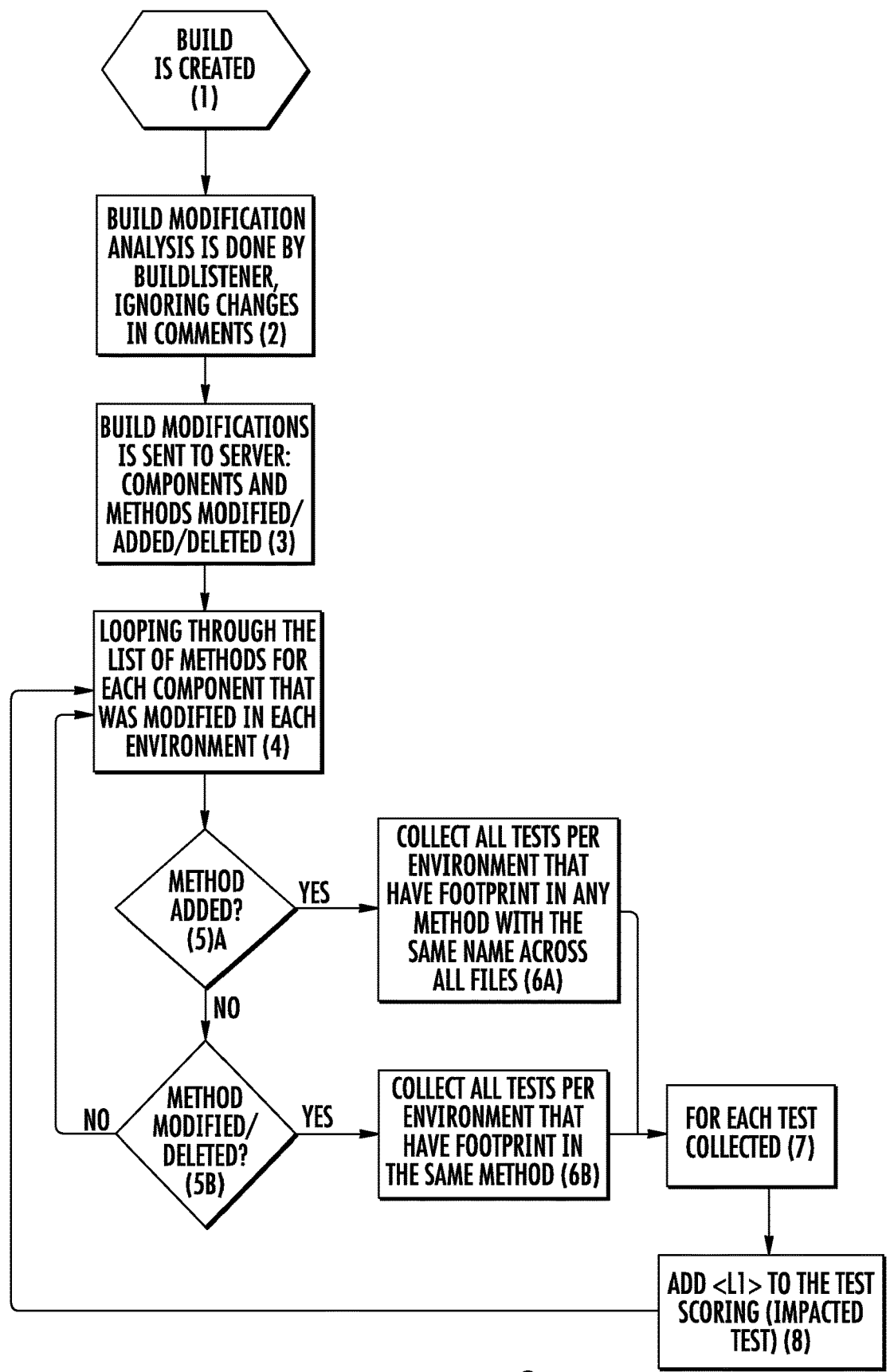
FIG. 3 shows an exemplary optional implementation for a set of methods for performing test scoring.

FIG. 3 shows an exemplary optional implementation for a set of methods for performing test scoring. In stage 1 a build is created. In stage 2, the build modification analysis is performed by the build listeners previously described, ignoring any changes in comments. In stage 3, any build modification information is sent to the server, optionally and preferably including any components and methods which have been modified, edited, or deleted.

Then, in stage 4, looping through the list of methods for each component change in each environment, the following processes are optionally and preferably performed. In stage 5a, it is determined whether a method has been added. If so, then in stage 6a, all tests are collected for the environment that have the same method name in their footprints. Footprints are the locations where the tests touch or otherwise analyze the application under test. Each test is done through code and may optionally be performed in a plurality of test stages, optionally over a plurality of environments. Quality holes are then determined according to each section of code in each environment. Unique quality holes are sections of code which were not tested by any test in any environment.

Figure 12A:
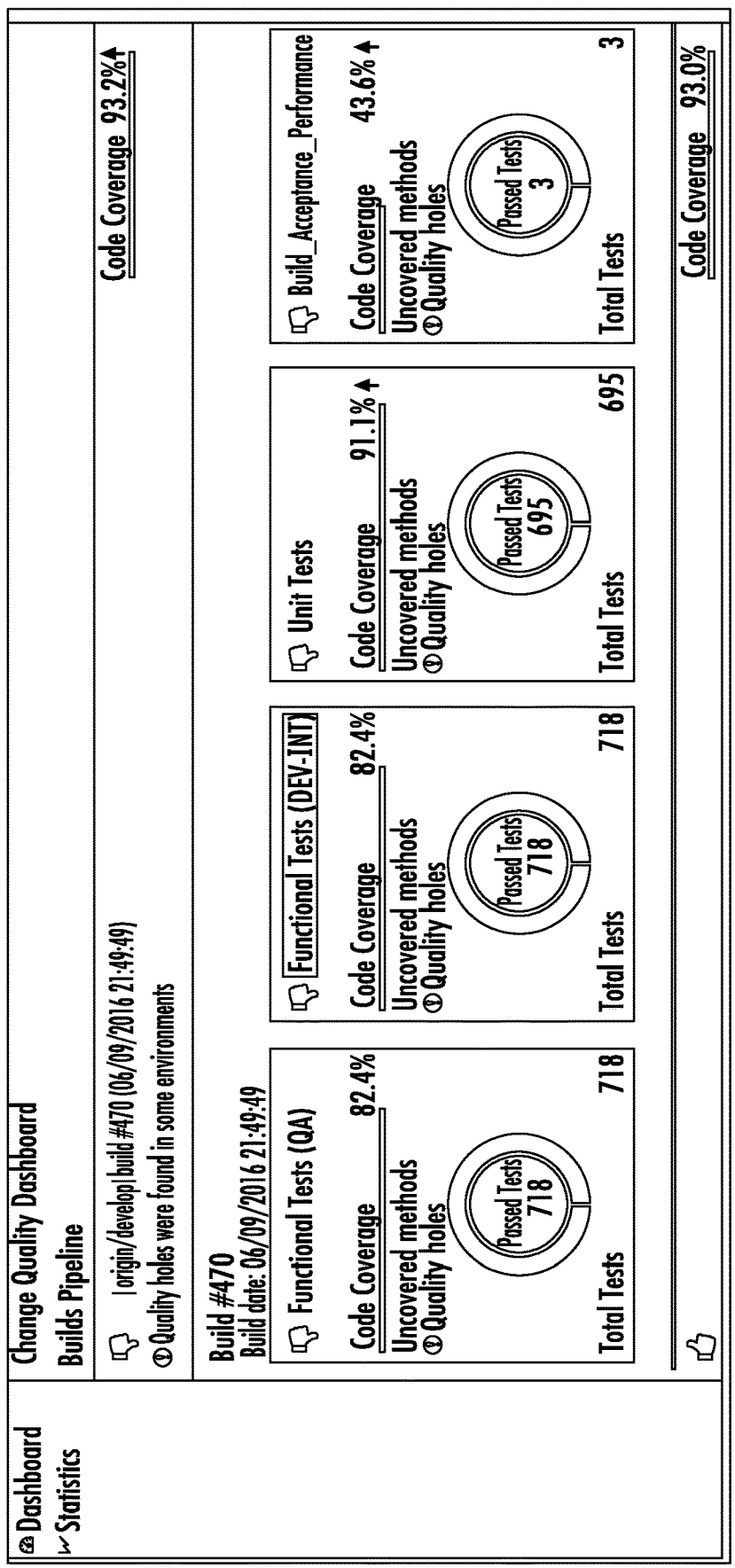
FIGS. 12A-12B show exemplary optional dashboards for demonstrating build end-to-end quality.
Figure 12B:
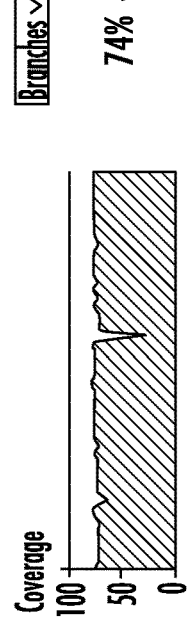

The tests may for example only enter a method and then exit it, or may also handle branching code or code related to a particular case. For the latter, the test may not have handled all of the branches or all of the cases, which is another type of quality hole. This process continues on to stage 7 for each test collected. An exemplary screenshot of a user interface dashboard such as interface 106 for receiving information from cloud application such as cloud application 122 concerning build coverage and quality holes is shown in FIG. 12B.

It is determined in stage 8 whether or not to add an L1 score to the test-scoring for the impacted test, to indicate that this test needs to be run again to increase test coverage quality and/or to increase the priority for running that test. Such an indication may optionally be determined independently of the test score, for example according to such considerations as test coverage and whether a test was skipped. The method then returns to stage 4 as shown.

Returning back to stage 5A, if a method wasn't added, then the build is assessed to determine whether a method was deleted or modified in stage 5B. If not, the process continues back looping to step 4. If a method was modified or deleted, then in Stage 6B, all tests are collected for each environment that had the footprint in the same method. Again, this option is preferably performed in order to determine overlap or other processes that are occurring across different environments. Then the method again returns to Stage (7) as previously described.

Figure 4:
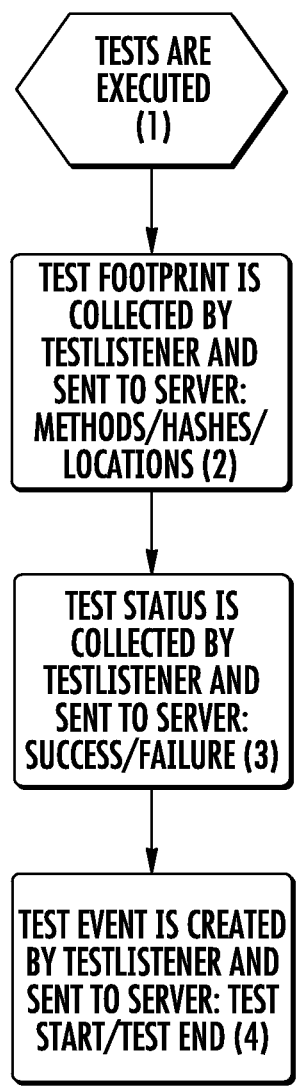
FIG. 4, shows optionally and preferably, a method that is performed for an on premise TestListener, as described here and according to at least some embodiments of the present invention.

Turning now to FIG. 4, optionally and preferably, a method is performed for an on premise TestListener, as described here and according to at least some embodiments of the present invention. In Stage (1), tests are executed. These tests may optionally be any kind of test for determining whether code is performing properly and is giving the correct results.

For any type of software computer test, once the tests are run, it is possible to determine what these tests have actually examined, termed the "test footprint". In Stage (2), the test footprint is collected by the TestListener and sent to the server. The test footprint includes information in regard to methods tested, hashes of the functions, and locations (for example within the build) to determine what was tested, which aspects of the code were tested and hence coverage, and also which tests were run in terms of test events. Hashes of the functions may optionally and preferably be used to map between the tests performed and the functions of the code, for example to determine whether certain parts of the code were tested. Hashes may optionally be used to determine whether a method has changed even if the method does not have a name.

In Stage (3), the test status is collected by the TestListener and sent to the service to determine whether or not success or failure has been detected for a particular test. In Stage (4), a test event is created by the TestListener and sent to the server, after which it is determined whether the test has actually been performed. In addition, optionally and preferably the status of the test and its results are determined.

Figure 5:
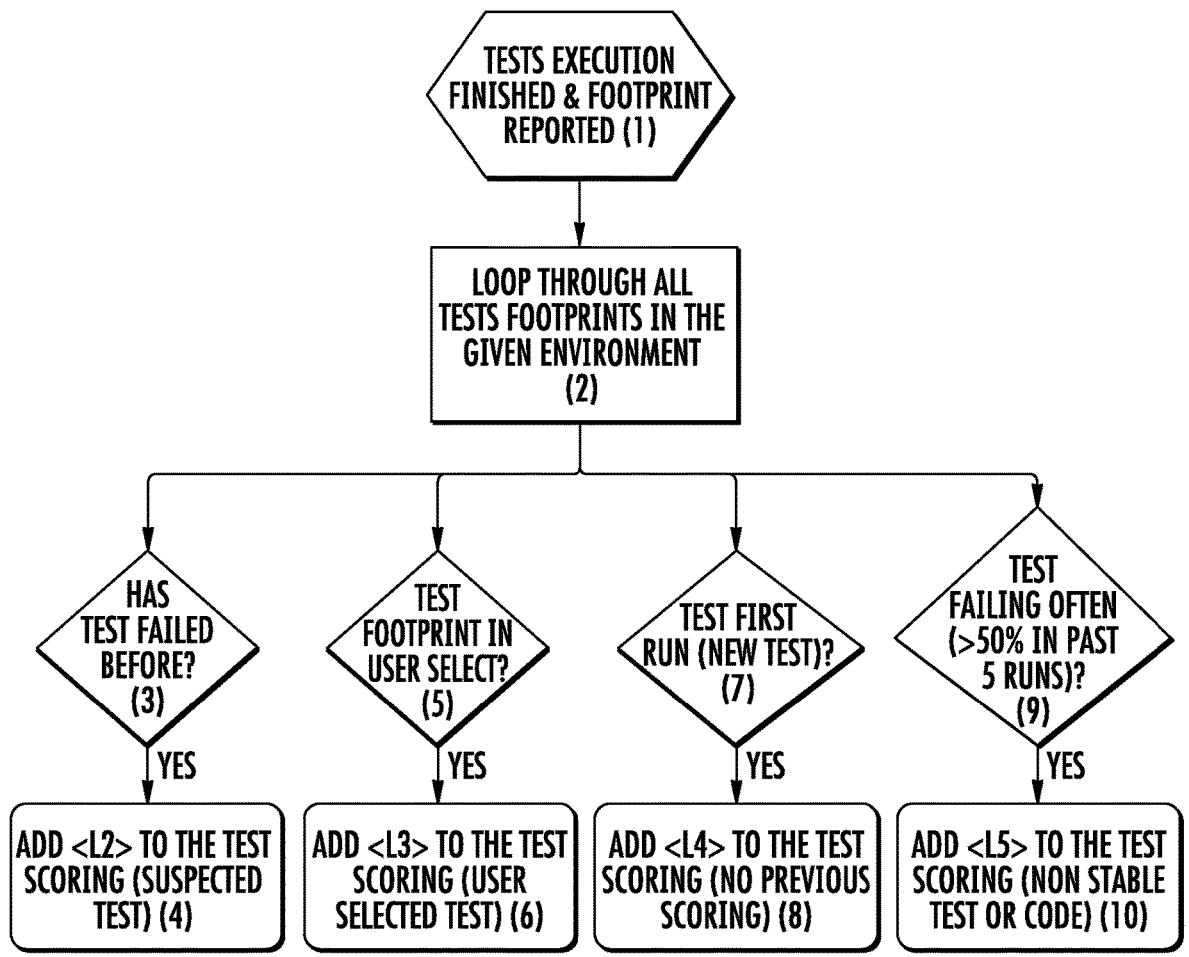
FIG. 5 relates to an optional exemplary method for test scoring post execution, according to at least some embodiments of the present invention.

FIG. 5 relates to an optional exemplary method for test scoring post execution, according to at least some embodiments of the present invention. This method is optionally performed in order to determine test coverage quality, and may also optionally be used to determine test priority for execution of future tests.

In Stage (1), test execution is finished, and the footprint is reported as previously described in FIG. 4. Next, in Stage (2), at least a priority, but preferably all, of the test footprints in the given environment are looped through for examination. For each loop, optionally and preferably, the following questions are considered in order to calculate the test quality coverage score.

In Stage (3) it is determined whether the test has failed before, if so, then L2 score is optionally added to the test scoring as a suspected test in Stage (4) which may optionally relate to test priority, for example in terms of whether certain test results need to be reconsidered or whether the test is insufficient and so should be performed again (or with a different test). In stage 5, it is determined whether at least part of the build or the test footprint (that is, coverage of the tests in relation to the build) falls within a user selected parameter. If so, then L3 score is optionally added to the test scoring as a user selected test in Stage (6), again to increase the priority of the test. For example, in cases where the user wishes to pay particular attention to a certain test and or to a certain code type, code function, or area of the code.

In Stage (7), it's considered whether this is the first time the test has been run, such that it is a new test. If so, then L4 score is added to the test scoring indicating that no previous scoring has occurred in stage 8. Therefore, this test needs to be considered particularly and or to receive special consideration in Stage (8).

In Stage (9) is considered whether the test fails often, for example, greater than 50 percent in the past five runs or neither parameter of frequent failure of the test. If so, then L5 is added to the test scoring, indicating it is a non-stable test or alternatively non-stable code in Stage (10).

Figure 7:
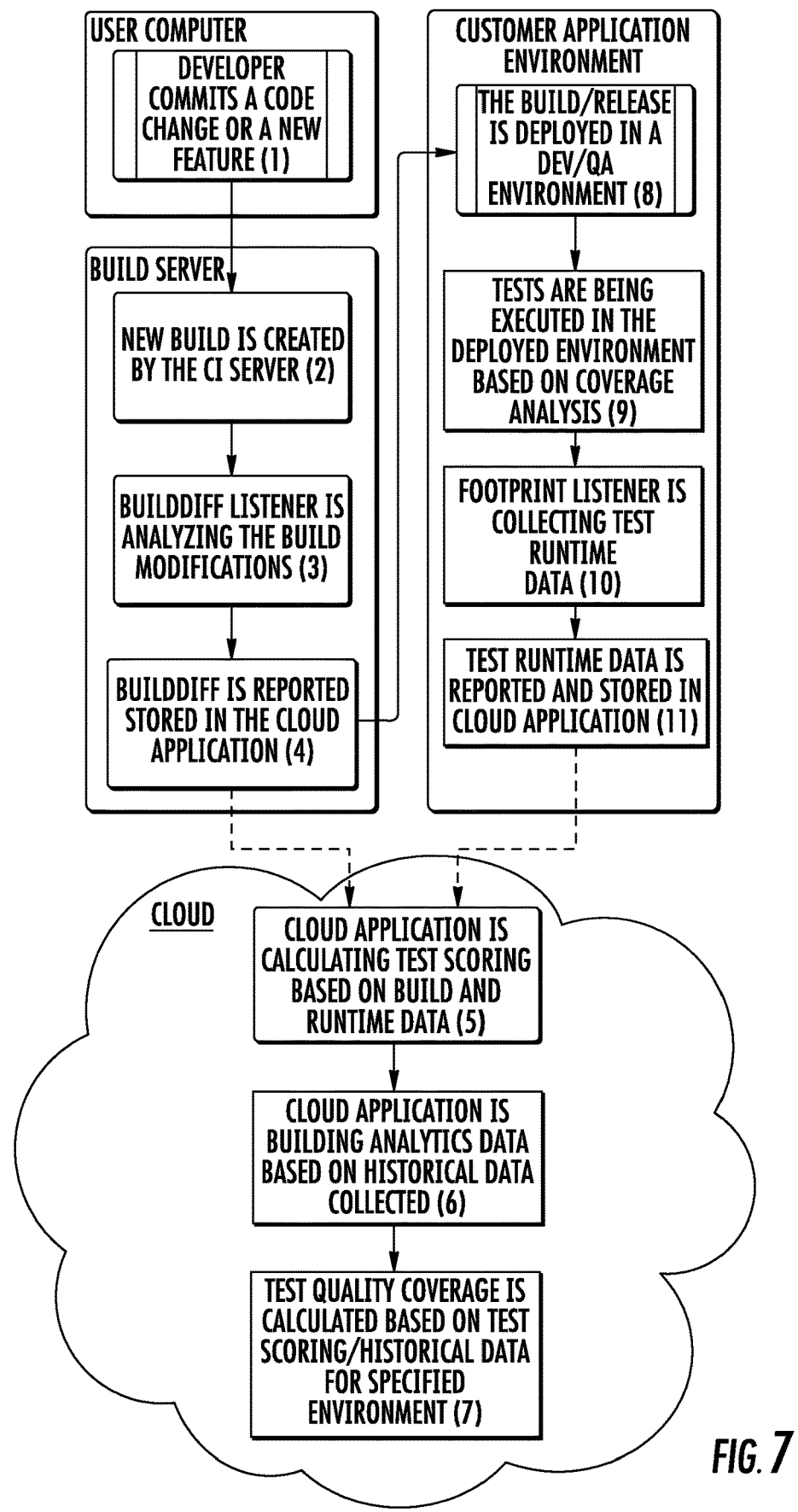
FIG. 7 relates to test quality coverage calculations according to an optional exemplary method.

These test scores may optionally be used to calculate test quality coverage, for example according to the exemplary method of FIG. 7.

Figure 6:
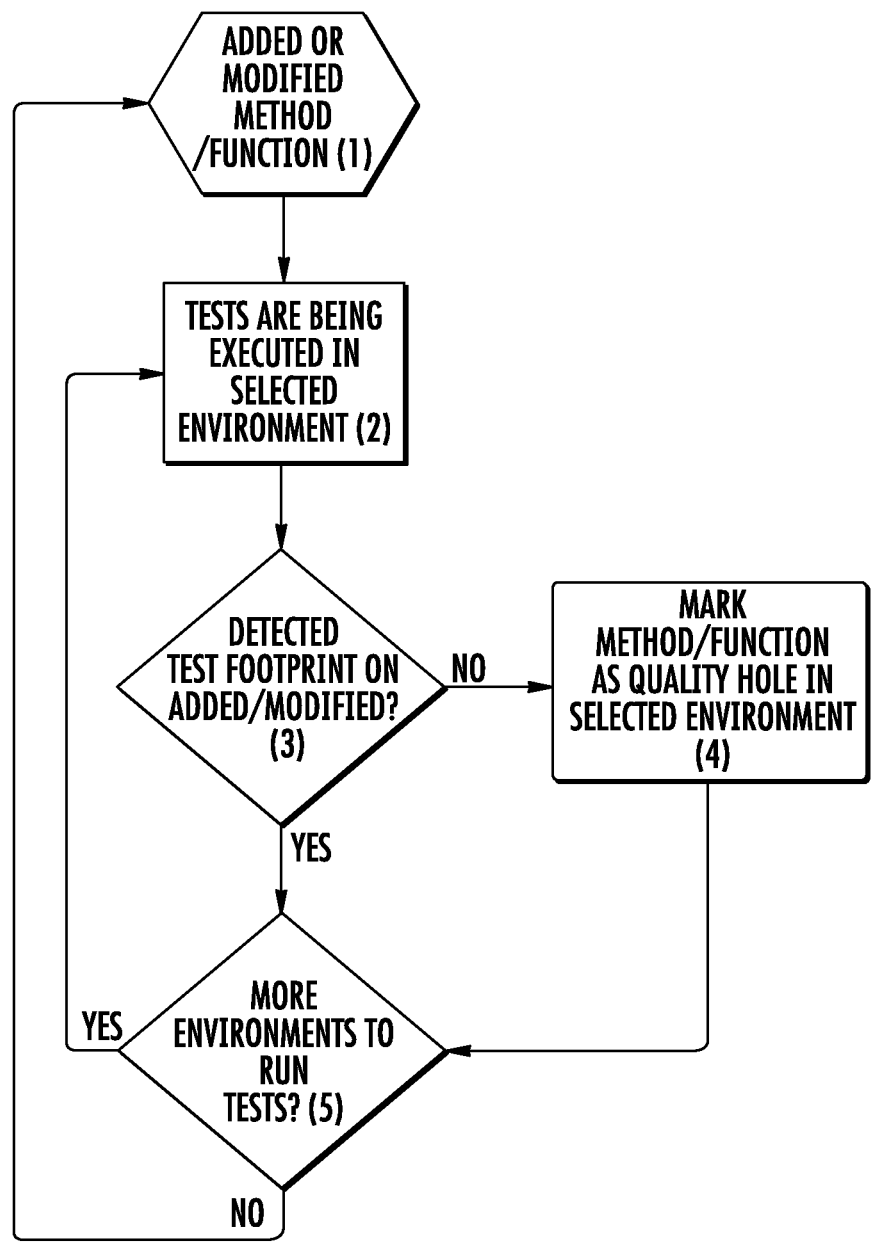
FIG. 6 optionally and preferably relates to a method for determining quality holes, according to at least some embodiments of the present invention.

FIG. 6 optionally and preferably relates to a method for determining quality holes, according to at least some embodiments of the present invention. Quality holes or test coverage holes are holes in the testing, which prevents code from being completely tested or covered for all run time or deployed environments. If such a hole exists, then it may be that the code is not adequately tested for particular environment or particular situation. In that case, it may be that the code may fail when deployed to particular environment or run time situation due to the lack of previous testing due to the quality hole.

Starting in Stage (1), if function or method has been added or modified. In Stage (2), tests are executed in the selected environment. Again, optionally and preferably, they're tested in a plurality of environments. The test may optionally be executed according to each environment separately. In Stage (3), it is determined whether a test footprint has been added or modified, whether that is detected. If not, then in Stage (4), the method of function is marked as a quality hole in the selected environment. If however, it has been added or modified, then in Stage (5) is determined whether more environments are required to run the test. If so, the method returns to Stage (2); and if not, then it returns to Stage (1) as previously described.

FIG. 7 relates to test quality coverage calculations according to an optional exemplary method. In Stage (1), the developer commits a code change or new feature, which may optionally be performed by the user computer. In Stage (2), a new build is created by the build server (CI Server). A CI server is a continuous integration server; a non-limiting example of such a server is the Jenkins server, which is an open source support software for CI/CD systems. In Stage (3), the BuildDiff listener analyzes the build modifications, including changes, additions to code, new code, or potentially code which has not yet appeared.

In Stage (4), the BuildDiff is reported and stored optionally in a cloud application. In Stage (5), the cloud application calculates test scoring based on build and run time data. In the first branch, it relates only to build data. In Stage (6), the cloud application builds analytic data based on the historical data collected. Then, in Stage (7), the test quality coverage is calculated based on current test scoring or historical data or both for this specified environment. Optionally, the results of the method performed as described in FIGS. 5 and 6 may be used to calculate test quality coverage and/or test quality holes. Another method for calculating code coverage and quality is described briefly below.

Optionally and preferably, these tests and examination for Stages (5) through (7) are performed separately for each environment. Now, as the process is performed from Stage (4) to Stage (8), the build is deployed at least in the development or quality assurance environment. Optionally and preferably, the build is deployed in each environment in which it is to be deployed in real life.

In Stage (9), tests are executed in the deploying environment based on coverage analysis as described above. Also, based on parameters determined by the particular environment. In Stage (10), the footprint listener collects test run time data. In Stage (11), the test run time data is reported and stored in the cloud application. Now the method returns to Stage (5) as previously described.

Common code coverage tools today focus on a single process, typically a process that runs the user code plus tests. For modern micro-services, multiple small services are used, and each one is usually tested independently, but when running system tests (tests that involve the majority of the system—multiple micro-services in this context), there is no way to gather the total code coverage (e.g. 67% of micro-service "A", 25% of micro-service B, weighted total 69%).

According to at least some embodiments, a method for performing code coverage calculations—and hence coverage quality—may optionally be performed as described herein. For each service, the total known Methods, "Ms", and the unique method hits, "ms" are calculated. The calculated coverage for the process is ms/Ms (for example, shown in percent, e.g. 5 methods out of 10=50%)

An "Integration build" or "Release" is a manifest/list of versioned components that constitute a full deliverable, deployable package. For example, release 123 of the product contains component A version 10 and component B version 25. There are many test tools out there, each one is suited for a different purpose/technology/methodology (e.g. TestNG for unit tests in Java, RSpec for behavior driven testing in Ruby, etc.). The present invention provides test listeners for multiple [supported] test tools, and these send data in a common format to the cloud application such as application 122 described above. Additionally, this data is used to track activity (method execution) that happens in the tested process[es], and match every activity to the test that caused it to get executed.

An end-to-end/system test is executed against the whole "Integration Build" and each test "passes" through one or more components. For the entire build, the weighted average is mb/Mb, where mb is the total number of hit methods across all services, and Mb is the total number of methods in all services.

Optionally, according to at least some embodiments, code coverage and quality are determined across a plurality of test tools. For this embodiment, test listeners are provided for a plurality of test tools, which send data in a common format for analysis. Additionally, this data is used to track activity (method execution) that happens in the tested process[es], and match every activity to the test that caused it to get executed.

To further assist with detection of code coverage quality, optionally a further embodiment is implemented, to detect testing coverage quality of interaction between micro-services through auto discovery of the test environment (sometimes referred to as "coloring").

In a micro-service (or any N-tier) architecture, services communicate with each other. Naturally, this communication is a potential subject for testing (explicitly or implicitly), and a test may trigger activity (method execution) in more than one process. It is necessary to associate each test with all executed methods in all processes. To do so, either all processes need to be notified that test XYZ has started and from this point on all methods should be associated with it, but for this it is necessary to know exactly which processes are involved in advance. A better approach is to do this without prior knowledge, but in order to do this it is necessary to track the execution. This is what "process coloring" is. Whenever process A (micro-service A) makes a request to process B (micro-service B), the test listener on process A augments the request with metadata about the ongoing test. On the listening side, the test listener on process B receives this metadata and stores it in memory. From this point on, all methods in process B will be associated with that test.

Every test listener also reports some information about the execution environment—the process ID, the machine Name, its IP addresses, local time, O/S, runtime versions (e.g. Java 7 version xx). Once all data is received for analysis, it is now possible to report the test environment (involved machines).

Figure 8:
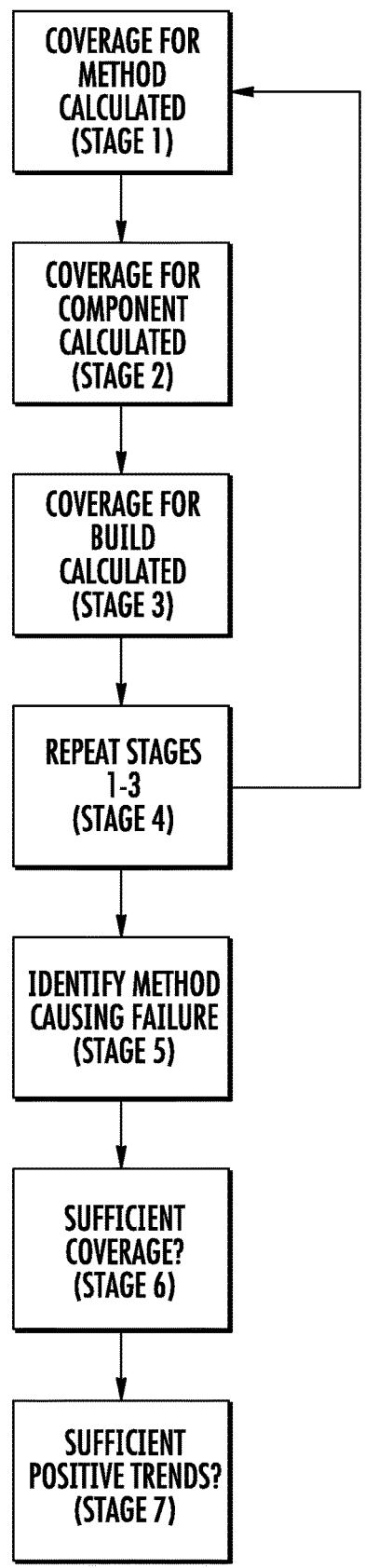
FIG. 8 shows an exemplary non-limiting flow for determining whether a quality hole is present in a build as part of a CI/CD (continuous integration, continuous delivery) process.

FIG. 8 shows an exemplary non-limiting flow for determining whether a quality hole is present in a build as part of a CI/CD (continuous integration, continuous delivery) process. The term "coverage" herein again refers to test coverage, the extent to which an item being considered has been tested.

In stage 1, the level of coverage for each method is preferably calculated for at least one environment. Optionally the level of coverage is only calculated for a plurality of methods.

In stage 2, the level of coverage for each component of the build, or at least a plurality of components, is preferably calculated for at least one environment. In this context, a component is optionally a portion of the code, including without limitation groups of methods, code lines or code branches, or micro-services. For example, a package or file could be examined. Alternatively, stages 1 and 2 may be performed together.

In stage 3, the level of coverage for the build overall is preferably calculated for at least one environment.

Optionally, the above stages 1-3 are only performed in reference to code elements that have been added or modified.

Optionally and preferably, in stage 4, one or more of stages 1-3 is repeated for any environments which have not been tested.

In stage 5, a method which is suspecting of causing failure (that is, unacceptable coverage) in at least one of stages 1-4 is identified, and is preferably flagged in a dashboard.

In stage 6, it is determined whether the methods and components of a build have been sufficiently tested for the build to pass to acceptance and hence to deployment. Sufficient testing may optionally relate to a percent level of coverage in terms of one or more of the overall build, methods, components and environments. Optionally all code parts must be tested, such that 100% test coverage must be achieved for each of the overall build, methods, components and environments.

In stage 7, the trends for coverage for the above are also optionally calculated. Also optionally, the trend may also determine whether the build is accepted; for example, if the trend for coverage in any part, overall or in one or more specific parts has decreased, then optionally the build is not accepted.

Figure 9:
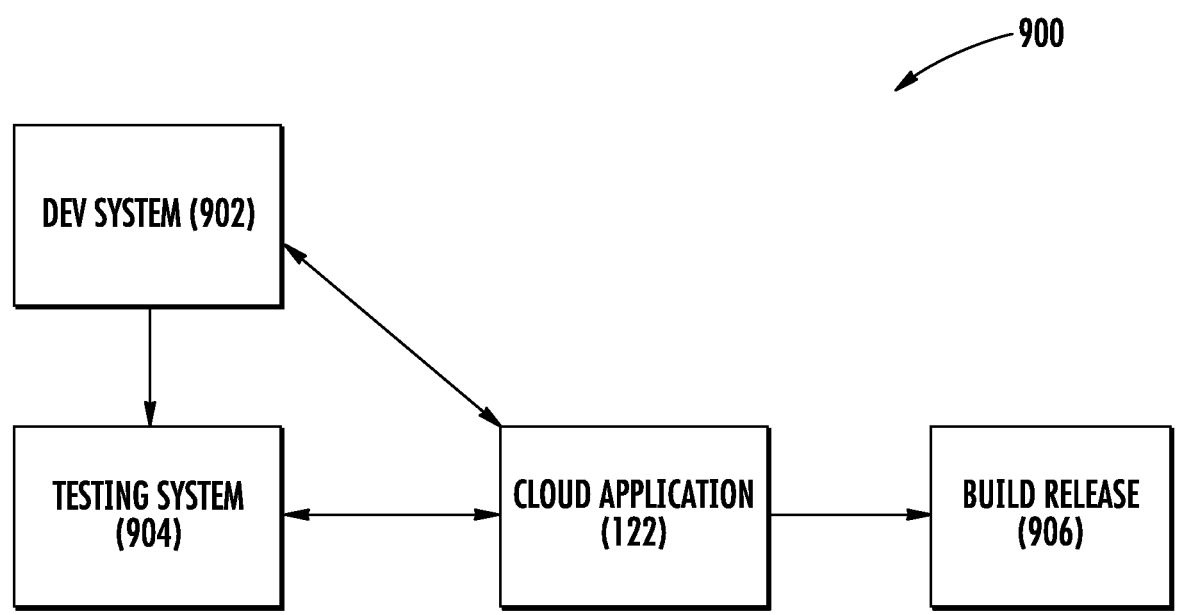
FIG. 9 shows an exemplary, illustrative embodiment of a system according to at least some embodiments for determining whether a build is to be released.

FIG. 9 shows an exemplary, illustrative embodiment of a system according to at least some embodiments for determining whether a build is to be released. As shown in a system 900, a dev system 902 creates a build for testing and release. The build is then tested by a testing system 904, optionally and preferably according to input from cloud application 122 as previously described. Optionally testing system 904 may be combined with cloud application 122 (not shown).

Cloud application 122 then analyzes the results to determine whether the build can be provided to build release 906, for subsequent release to the production environment.

Figure 10A:
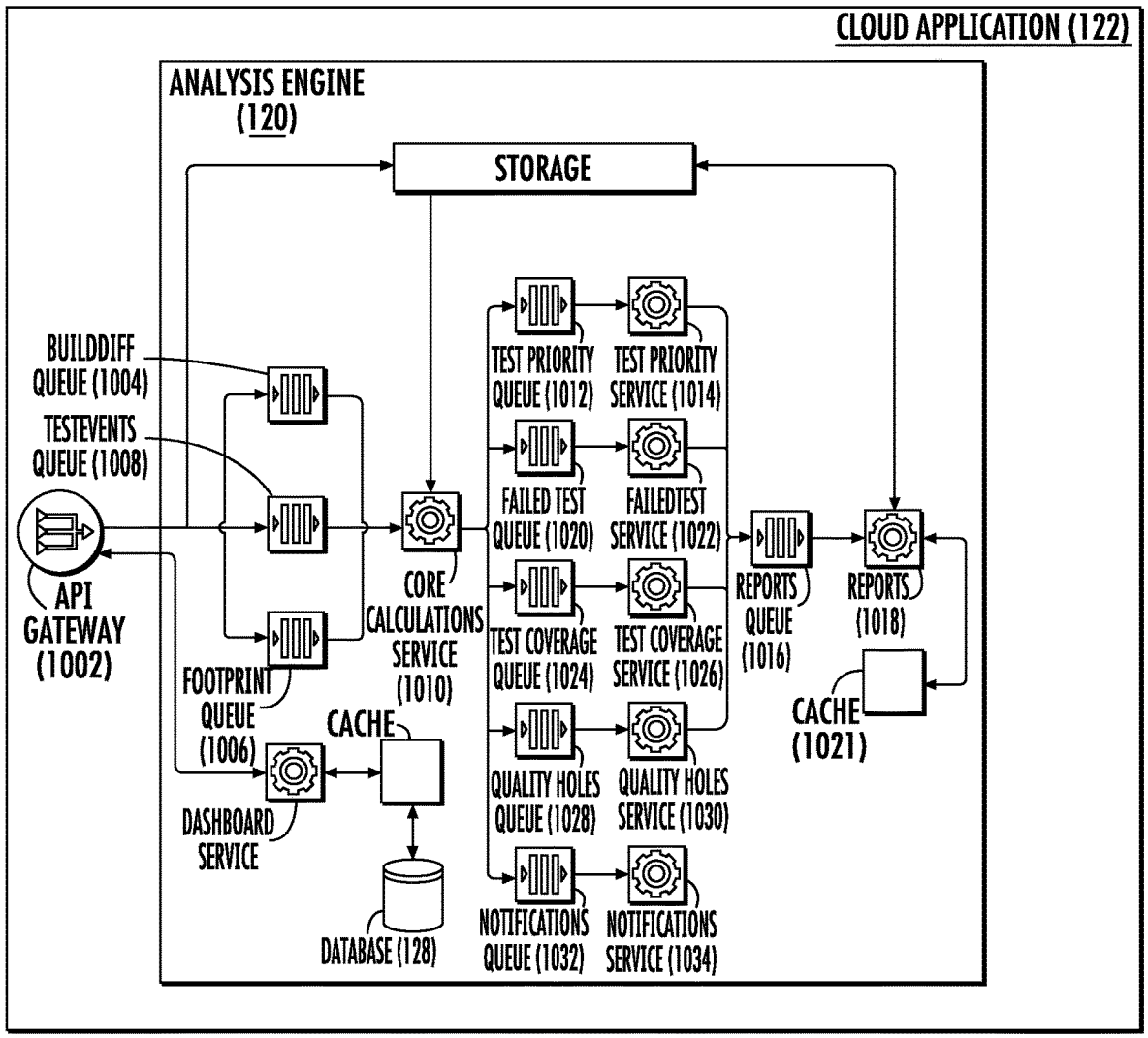
FIGS. 10A-10C show optional exemplary but alternative implementation of Analysis Engine 120 according to at least some embodiments of the present invention.

FIG. 10A shows an optional exemplary but alternative implementation of Analysis Engine 120 according to at least some embodiments of the present invention. As shown, an API gateway 1002 connects to analysis engine 120 which may optionally and preferably feature various components for performing the test analysis and determining if sufficient results have been obtained.

Analysis engine 120 comprises BuildDiff Queue 1004, Footprint Queue 1006, and TestEvents Queue 1008. These queues receive information about tests that have been performed and changes to code as well as footprints of the tests on the applications under test, and in turn preferably connect to a core calculations service 1010. Core calculations service 1010 receives build changes (methods/branches and lines added/modifies/deleted), the results and identity of tests, and also the footprints. Core calculations service 1010 then maps the code to the results and identity of tests, and the footprints (in terms of what is tested), and provides this information to additional services for precise calculations, for example to detect a quality hole. Optionally these calculations may be combined to a single service (not shown), but are preferably split in this way in order to reduce computational load and to increase scalability. The mapping functions are preferably placed in one service so as to provide enough computational power to the particular subset of these functions required for mapping.

Without wishing to be limited in any way, core calculations service 1010 is preferably separated out as a service because although it is the first service to begin the quality coverage determination and quality hole detection, information about the tests and code may be expected to arrive according to the order of generation and transmission, but not necessarily in the order in which the information is needed. The information needs to be stored until it can be accessed which can require a great deal of memory, for example.

Next core calculations service 1010 preferably connects to a test priority queue 1012 which in turn connects to a test priority service 1014, for determining the list and order for test priorities. Basic information regarding these calculations is provided by core calculations service 1010 to test priority queue 1012 so that test priority service 1014 can determine the details of the test priorities. Information regarding test priorities is sent to a reports queue 1016, which then connects to a reports module 1018 which sends the reports to storage 1019. Storage 1019 does not need to be expensive storage such as a database. If the user requests a report, then it is sent to a cache 1021. The reports are then sent through API gateway 1002 from cache 1021 back to the customer premises (not shown), for example to enable the customer computer to analyze the reports and automatically determine the order in which further tests should be run.

The remaining queues connected to core calculations service 1010 receive equivalent information about the respective material that they need to calculate, and in turn provide detailed reports to reports queue 1016, so that the reports can ultimately be sent to the customer premises.

For example, a failed test queue 1020 receives calculations regarding which tests were executed and their status and provides this information to a failed test service 1022 in order to perform a detailed analysis of what the test results are, so that a detailed report can be created.

A test coverage queue 1024 receives information regarding the extent of test coverage, optionally and preferably in different environments and for a new build (according to differences with the old build), and provides this information to a test coverage service 1026, which then performs the detailed analysis of test coverage.

A quality holes queue 1028 receives information regarding any quality holes, optionally and preferably in different environments and for a new build (according to differences with the old build), and provides this information to a quality holes service 1030, which then performs the detailed analysis of quality holes.

A notifications queue 1032 receives information regarding specific tests, coverage levels or any other information that the user is interested in for analysis by notifications service 1034; this report is preferably sent to cache 1021 for transmission to the user.

Figure 10B:
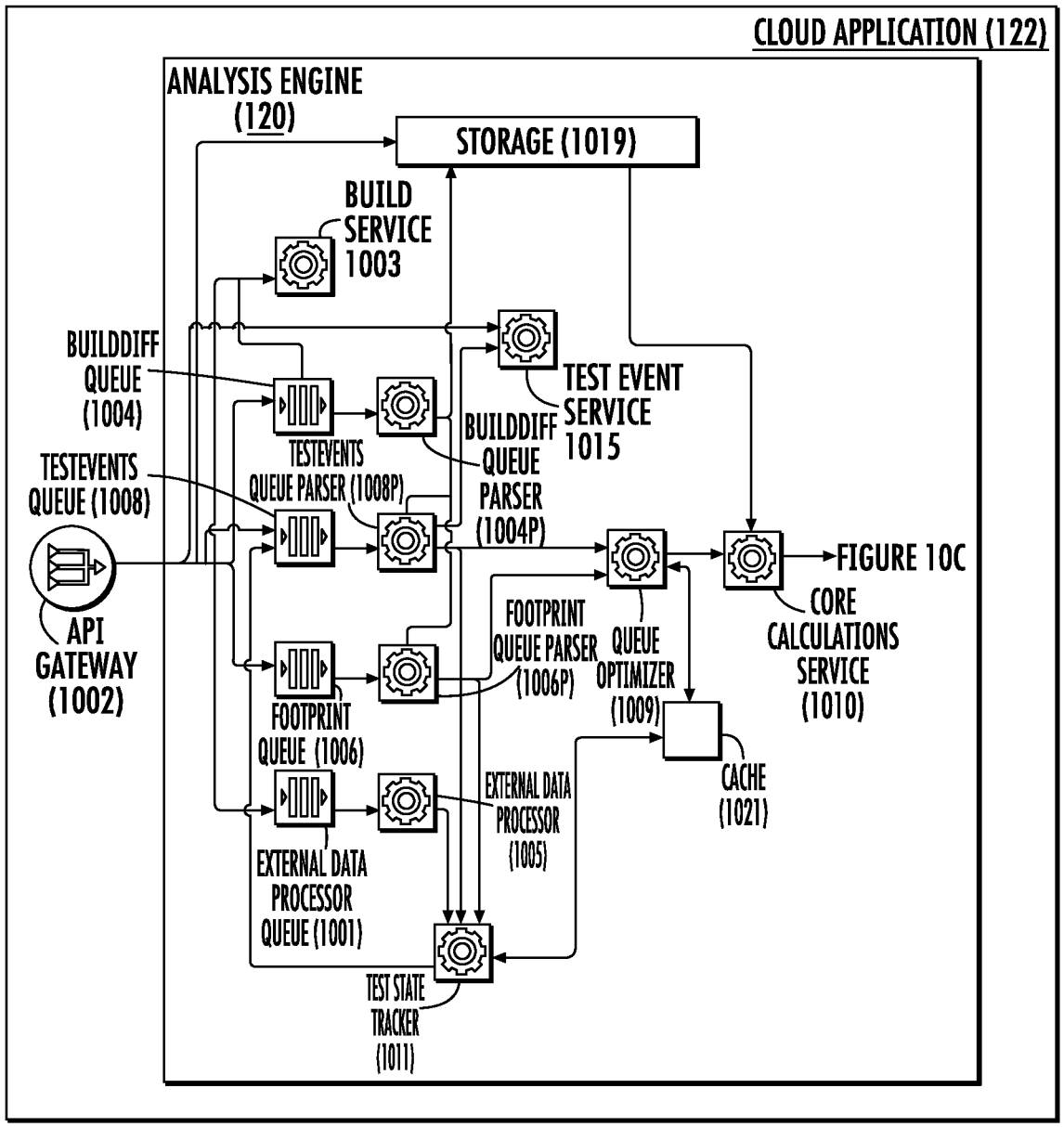
Figure 10C:
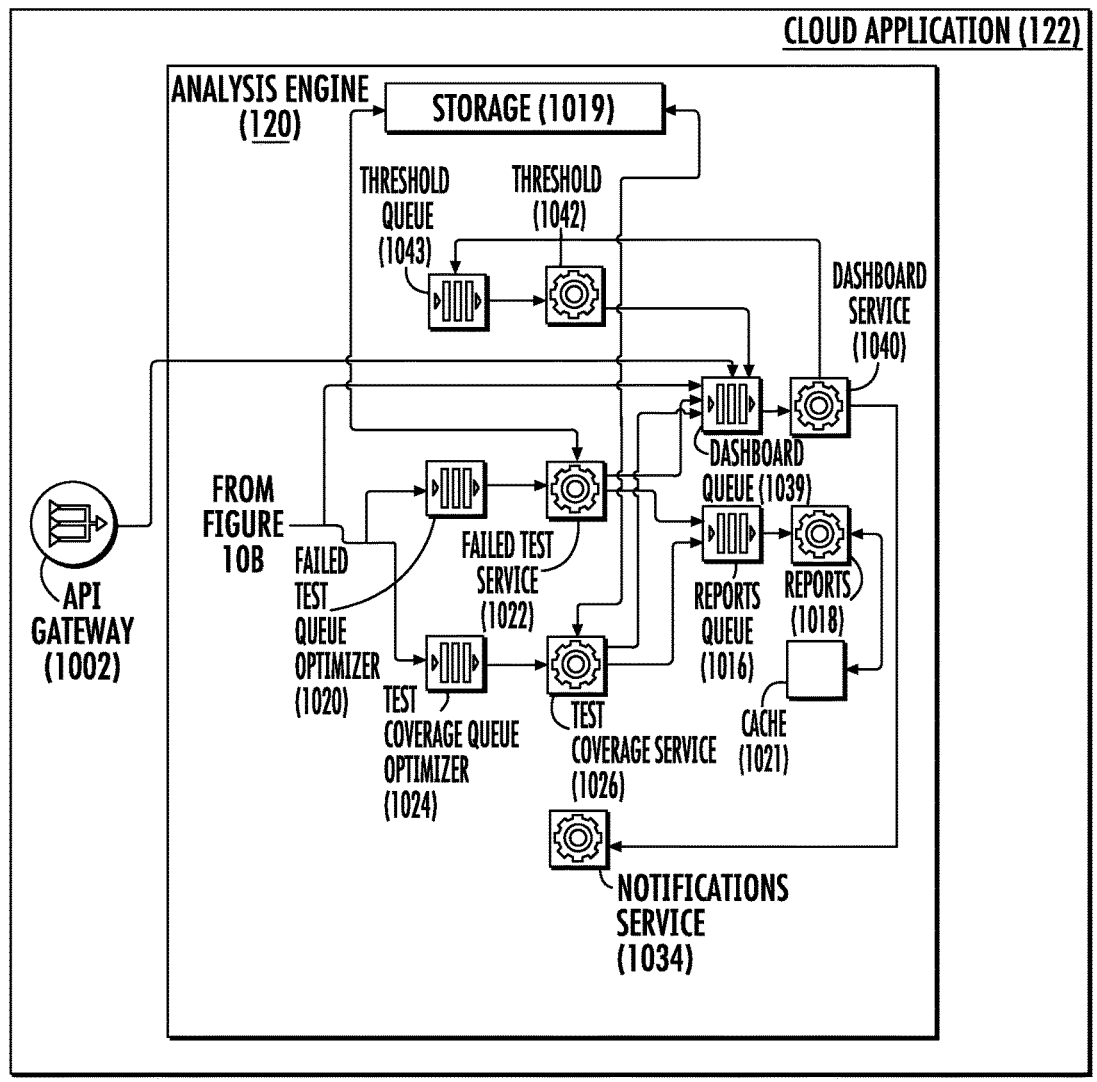

FIGS. 10B and 10C show an optional exemplary but alternative implementation of Analysis Engine 120 according to at least some embodiments of the present invention. As shown, an API gateway 1002 connects to analysis engine 120 which may optionally and preferably feature various components for performing the test analysis and determining whether sufficient results have been obtained. Gateway 1002 connects to external data processor queue 1001, storage 1019, dashboard queue 1039 for collecting changes and information, such as for failed tests, trends etc, and passing these to the dashboard service 1040, build service 1003, BuildDiff Queue 1004, Footprint Queue 1006, and test event Queue 1008 which receives information about tests and passes this to the TestEvents service 1015. These queues receive information about tests that have been performed and changes to code, and in turn preferably connect to other modules which may include parsers for collecting raw data and saving it for passing on to other services and optionally performing relevant determinations as below. The connections are as follows:

External data processor queue 1001 connects to external data processor 1005 which performs the calculations for external reports for the dashboard and test labs, including but not limited to information about bugs, static analysis tool results, and functional requirements;

BuildDiff Queue 1004 connects to BuildDiff queue parser 1004P for preferably calculating the differences between the builds and also to build service 1003 which preferably sends information about the build to the BuildDiff queue 1004 and determines against which other build to compare, as well as which tests run against which part of the build, and whether a part has changed and isn't tested. BuildDiff queue parser 1004P also connects to storage 1019 for storing the results of the calculated difference between the builds.

Footprint Queue 1006 connects to Footprint Queue Parser 1006P which preferably calculates the footprint of the test coverage and which parts of code were examined by a test;

TestEvents Queue 1008 connects to TestEvents Queue parser 1008P which preferably collects data about test events for informing other services including but not limited to test starts, and test ends. TestEvents Queue parser 1008P further connects to test event service 1015 for analyzing the implication of the test event related to test coverage, as well as the state of the tests and also to storage 1019 for storing of results;

Test state tracker 1011 receives input from external data processor 1005, Footprint Queue Parser 1006P, and TestEvents Queue parser 1008P. This input enables it to preferably monitor when tests start or end. It also receives results from external data processor 1005 and tracks these, and can send information through API. It also determines whether a test is still running to know whether additional coverage will be received. The output of Test state tracker 1011 is fed into TestEvents Queue 1008. Test state tracker 1011 is also connected to cache 1021 for temporary storage of information;

TestEvents Queue parser 1008P and Footprint Queue Parser 1006P both connect to Queue optimizer 1009 for optimizing use of memory for calculations, and context switching manager. Context switching enables memory to be loaded with information as infrequently as possible, to increase efficiency. Queue optimizer 1009 connects to cache 1021 for temporary storage of information.

Queue optimizer 1009 connects to core calculations service 1010. Core calculations service 1010 receives build changes, the results and identity of tests, and also the footprints. Core calculations service 1010 then maps the code to the results and identity of tests, and the footprints (in terms of what is tested), and provides this information to additional services for precise calculations, for example to detect a quality hole. Optionally these calculations may be combined into a single service (not shown), but are preferably split in this way in order to reduce computational load and to increase scalability. The mapping functions are preferably combined into one service so as to provide enough computational power to the particular subset of these functions required for mapping.

Core calculations service 1010 determines the test coverage and for example also optionally determines the quality hole detection, by building a matrix of all parts of the code. Core calculations service 1010 then determines that each part of the code has been tested, alone and also optionally through integration (for example combinations of code). Core calculations service 1010 receives the build, with the analyzable components provided (such as for example methods, branching functions, lines and so forth) from queue optimizer 1009 upon completing a calculation and then starts a new calculation, according to information received from queue optimizer 1009. Core calculations service 1010 then places all components in a matrix to check the coverage of each component with one or more tests. Preferably also the results of the test are included, for example in terms of whether the test succeeded. Core calculations service 1010 preferably calculates coverage according to successful tests, rather than merely whether a test ran.

Optionally the memory that serves core calculations service 1010 may be distributed in order to handle large amounts of code, whether by separate components or type of test to be run on each component. Including both successful and failed results may optionally be used to determine whether a test succeeded—or failed—according to the last time that the test(s) were run, more preferably according to whether one or more code components changed. To increase scalability, optionally sharing is performed, so that information that is required for a particular set of operations is stored on the same or similarly accessible memory, again to avoid swapping in and out of memory. With sufficient memory and a sufficiently optimized memory structure, optionally core calculations service 1010 acts to collect information, which is then served directly to test coverage queue optimizer 1024 and failed test queue optimizer 1020. Optionally queue optimizer 1009 may operate to reduce the demand on memory as previously described.

Without wishing to be limited in any way, core calculations service 1010 is preferably separated out because although it is the first service to begin the quality coverage determination and quality hole detection, information about the tests and code may be expected to arrive according to the order of generation and transmission, but not necessarily in the order in which the information is needed. The information needs to be stored until it can be accessed which can require a great deal of memory, for example. Core calculations service 1010 is preferably able to analyze the results of tests much more quickly so that test analysis, and calculation of the results, can be determined in real time. Also, because the system and methods are highly asynchronous, core calculations service 1010 is preferably organized to be able to analyze the results of the tests, even if the results appear in various non-predetermined, and non-deterministic, orders. For example, information regarding the components of the build may optionally arrive after the test and/or footprint results.

Several queues are connected to core calculations service 1010 and receive relevant information related to the aspect of testing that they need to analyze.

Failed test queue optimizer 1020 receives calculations regarding which tests failed and provides this information to a failed test service 1022 in order to perform a detailed analysis of which tests failed. The output of failed test service 1022 is preferably sent to dashboard queue 1039 and reports queue 1016, so that a detailed report can be created preferably covering one or more of failed tests, passed tests and test status overall.

Test coverage queue optimizer 1024 receives information regarding the extent of test coverage, optionally and preferably in different environments and for a new build (according to differences with the old build), and provides this information to a test coverage service 1026, which then performs the detailed analysis of test coverage also based on information retrieved from storage 1019.

These analyses from failed test service 1022 and test coverage service 1026 are forwarded to a reports queue 1016 and to reports service 1018 which listens to events from reports queue 1016 which then connects to a reports module 1018 which creates and sends the reports to storage 1019. If the user requests a report, then it is sent to a cache 1021. The reports are then sent through API gateway 1002 from cache 1021 back to the customer premises (not shown).

Core calculations service 1010, API gateway 1002, failed test service 1022 and test coverage service 1026 connect to dashboard queue 1039. Dashboard queue 1039 connects to dashboard service 1040 which listens to events from dashboard queue 1039, generates reports for sending to a dashboard at the client's location, and also determines how to display and arrange the dashboard data to the client. Dashboard service 1040 connects to threshold queue 1043 which in turn connects to threshold service 1042 which preferably checks the thresholds and rules set by the client/user and then checks whether thresholds are met or exceeded. Threshold service 1042 feeds back into dashboard queue 1039 such that these threshold indications are preferably displayed on the dashboard, for example, as red or green indications or other suitable indications of threshold exceeding (as shown in FIGS. 12A and 12B).

Notifications service 1034 receives information from the dashboard service regarding specific tests, coverage levels or any other information that the user is interested in and provides this information for transmission to the user, for example by sending a notification through email or Slack or any other messaging service as known in the art. Non limiting examples of reports include weekly reports or reports that a build is ready.

Figure 11:
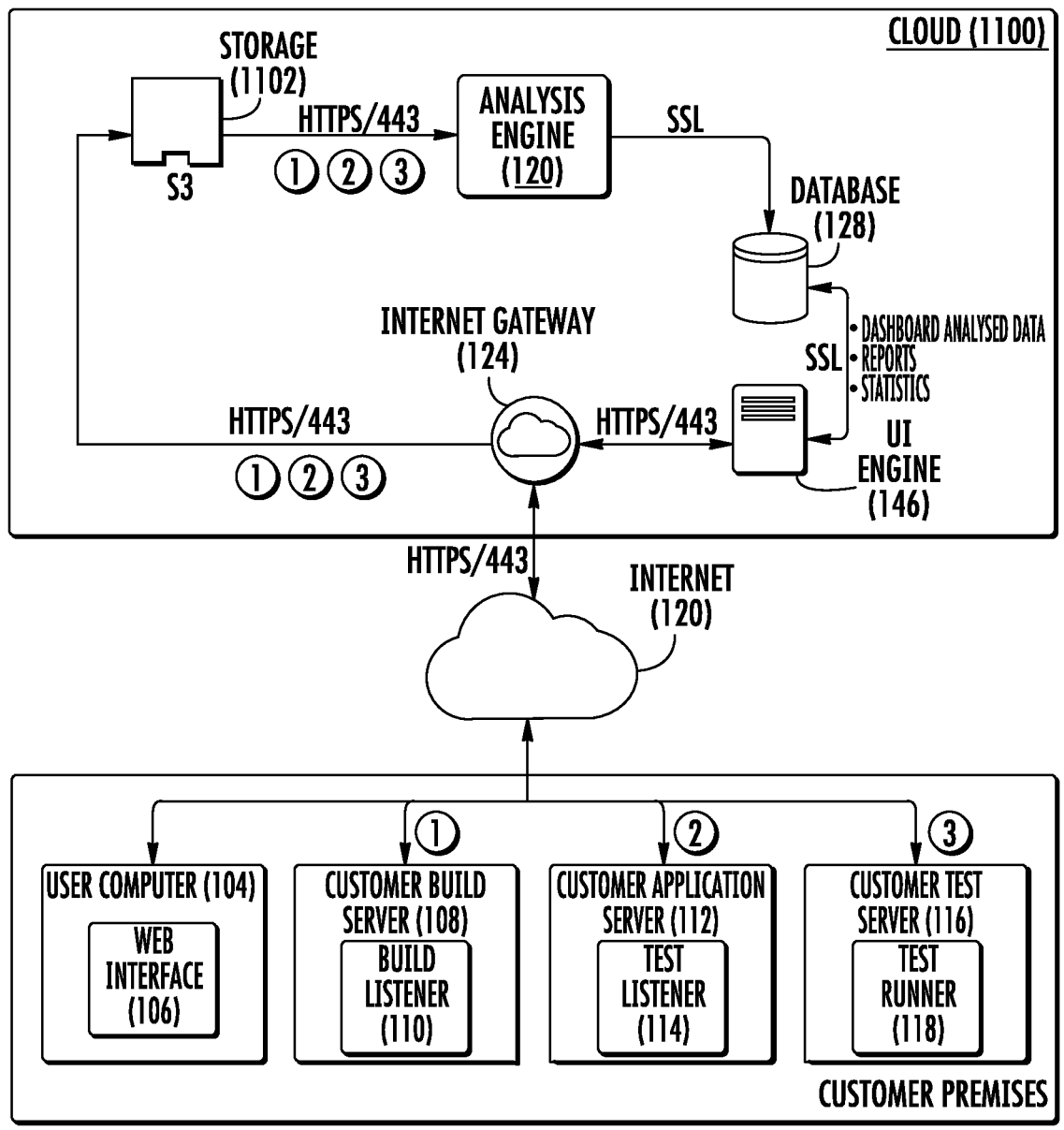
FIG. 11 shows an exemplary system for security according to at least some embodiments of the present invention.

FIG. 11 shows an exemplary system for security according to at least some embodiments of the present invention. As shown, in a cloud implementation 1100, there is provided a storage 1102, which for example may optionally be implemented according to the Amazon AWS S3 system. Storage 1102 is in communication with previously described analysis engine 120, and is optionally and preferably provided according to the Amazon AWS platform. The remaining components are as previously described.

Security is optionally and preferably provided according to the Amazon AWS platform as well. Furthermore, optionally and without limitation, storage 1102 preferably communicates with analysis engine 120 through the HTTPS/443 protocol. Internet gateway 124 preferably communicates with storage 1102 and UI engine 128 through the HTTPS/443 protocol. In both cases, such communication optionally and preferably includes build meta data, including differences with previous builds; coverage meta data on methods/functions covered during test per listener running on the Application Under Test; and test event data, including test execution meta data: test names, start time, end time, status and so forth.

Customer build server 108 preferably communicates the build meta data from build listener 110 to storage 1102. Customer application server 112 preferably communicates the coverage meta data from test listener 114 to storage 1102. Customer test server 116 preferably communicates the test execution meta data to storage 1102.

Additionally, internet gateway 124 preferably communicates with internet 120 through the HTTPS/443 protocol.

Analysis engine 120 and UI engine 126 both optionally and preferably communicate with database 128 according to the SSL protocol.

FIGS. 12A and 12B show exemplary optional dashboards for demonstrating code quality. As shown, test coverage quality holes and reduced quality, including test failures, are shown in red; passed tests are shown in green.

While the invention has been described with respect to a limited number of embodiments, it will be appreciated that many variations, modifications and other applications of the invention may be made, including different combinations of various embodiments and sub-embodiments, even if not specifically described herein.

What is claimed is:

1. A method for performing continuous quality management of a code build comprising:
   a. providing a quality management platform comprising: a build listener, a test listener and an analysis engine;
   b. analyzing said code build by said build listener to determine code changes made from an immediately preceding code build;
   c. receiving test results by said test listener;
   d. determining the quality of said code build by said analysis engine;
   e. receiving test footprints by said test listener;
   f. analysis of at least one test in one test environment by the analysis engine;
   g. determining build quality based on one of:
      i. whether the code changes have been tested;
      ii. whether the code changes have not been adequately tested;
      iii. assessment of at least one previously performed test;
      iv. assessment of at least one test coverage;
      v. assessment of at least one test coverage hole; or
      vi. a combination thereof;
   h. wherein the build quality comprises a build score; and
   wherein assessment of the at least one coverage hole comprises:
      a. determining code changes made from an immediately preceding code build;
      b. calculating a level of coverage for a plurality of components of said code build for at least one environment, wherein components of said code build includes code lines or code branches, and micro-services;
      c. calculating an overall level of coverage of said code build for the at least one environment;
      d. identifying a component suspected of causing failure and flagging the component; and
      e. determining whether all components of said code build have been tested.

2. The method of claim 1, further comprising:
   a. generating a report for a user, the report comprising information related to one or more of build quality, extent of test coverage in different environments, failed tests, one or more of test status, and quality hole detection; and
   b. displaying the report to the user on a dashboard.

* * * * *